US009509377B2

(12) United States Patent
Sayana et al.

(10) Patent No.: US 9,509,377 B2
(45) Date of Patent: Nov. 29, 2016

(54) METHOD AND APPARATUS FOR RANK ADAPTATION IN AN ORTHOGONAL FREQUENCY DIVISION MULTIPLEXING COMMUNICATION SYSTEM

(75) Inventors: Krishna Kamal Sayana, Arlington Heights, IL (US); Tyler A. Brown, Mundelein, IL (US); Robert T. Love, Barrington, IL (US); Vijay Nangia, Algonquin, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 680 days.

(21) Appl. No.: 13/290,401

(22) Filed: Nov. 7, 2011

(65) Prior Publication Data

US 2013/0114425 A1 May 9, 2013

(51) Int. Cl.
H04B 7/02 (2006.01)
H04B 7/04 (2006.01)
H04B 7/06 (2006.01)

(52) U.S. Cl.
CPC ............ *H04B 7/024* (2013.01); *H04B 7/0413* (2013.01); *H04B 7/063* (2013.01); *H04B 7/0465* (2013.01); *H04B 7/0626* (2013.01)

(58) Field of Classification Search
CPC .. H04B 7/024; H04B 7/0413; H04B 7/0626; H04B 7/063; H04B 7/0465; H04B 7/0632; H04B 7/0417; H04B 7/0452; H04B 7/0634; H04B 7/0639; H04B 7/0641; H04B 7/0645; H04L 1/0026; H04L 1/06; H04L 1/20
See application file for complete search history.

(56) References Cited

U.S. PATENT DOCUMENTS 7,711,385 B2    5/2010    Ostman et al.
2007/0249363 A1 10/2007   Amalfitano et al.
(Continued)

FOREIGN PATENT DOCUMENTS

WO    2010/106490 A2    9/2010
WO    2011055989 A2     5/2011
WO    WO 2011126025 A1 * 10/2011

OTHER PUBLICATIONS

"3rd Generation Partnership Project;Technical Specification Group Radio Access Network; Evolved Universal Terrestrial Radio Access (E-UTRA); Physical layer procedures (Release 10)", 3GPP Standard; 3GPP TS 36.213, 3rd Generation Partnership Project (3GPP), Mobile Competence Centre ., 650, Route Des Lucioles ., F-06921 Sophia-Antipolis Cedex , France, vol. RAN WG1, No. VI0.3.0, Sep. 25, 2011, pp. 1-122.
(Continued)

*Primary Examiner* — Yee Lam
(74) *Attorney, Agent, or Firm* — Faegre Baker Daniels LLP

(57) ABSTRACT

A communication system provides for adaptive rank determination, for example, a rank 2 transmission in instances where a rank 1 transmission may be indicated under supported feedback modes in current standards where no explicit power adaptation can be assumed, for example, where a user equipment (UE) is limited to reporting a rank 1 channel due to a large dynamic range of a signal or due to a signal received by the UE from one base station (BS) antenna port drowning out a signal received by the UE from another BS antenna port. The communication system provides for the UE to implement rank 2 transmission in such instances by using per-antenna port power control at a BS serving the UE. In one embodiment, the BS controls the rank determination at the UE by signaling transmit power or power offset related parameters to use for rank and transmission parameters determination and feedback.

46 Claims, 13 Drawing Sheets

(56) References Cited

U.S. PATENT DOCUMENTS

| | | | |
|---|---|---|---|
| 2008/0192868 A1* | 8/2008 | Budianu et al. | 375/344 |
| 2009/0196245 A1 | 8/2009 | Ji | |
| 2010/0054358 A1* | 3/2010 | Ko et al. | 375/267 |
| 2010/0311349 A1 | 12/2010 | Koo et al. | |
| 2011/0141928 A1* | 6/2011 | Shin et al. | 370/252 |
| 2011/0194504 A1* | 8/2011 | Gorokhov et al. | 370/329 |
| 2011/0319027 A1* | 12/2011 | Sayana et al. | 455/67.11 |
| 2012/0009917 A1* | 1/2012 | Baker et al. | 455/422.1 |
| 2012/0044902 A1* | 2/2012 | Sun et al. | 370/329 |
| 2012/0076236 A1* | 3/2012 | Ko et al. | 375/296 |
| 2012/0147773 A1* | 6/2012 | Kim et al. | 370/252 |
| 2012/0320819 A1* | 12/2012 | Kim et al. | 370/315 |
| 2012/0320826 A1* | 12/2012 | Kim et al. | 370/328 |
| 2013/0077518 A1* | 3/2013 | Abe et al. | 370/252 |

OTHER PUBLICATIONS

Ericsson et al: "Enhanced power measurement offset for MU-MIMO". 3GPP Draft; RI-105324. 3rd Generation Partnership Project (3GPP). Mobile Competence Centre ; 650. Route Des Lucioles ; F-06921 Sophia-Antipolis Cedex; France. vol. RAN WG1. no. Xi 'an; 20101011. Oct. 5, 2010. XP050450484. [retrieved on Oct. 5, 2010] A p. 2

ZTE: "Power Offset Issue on DMRS Mapping", 3GPP Draft; R1-101403 Power Offset Issue on DMRS Mapping. 3rd Generation Partnership Project (3GPP). Mobile Competence Centre ; 650. Route Des Lucioles ; F-06921 Sophia-Antipolis Cedex; France.vol. RAN WG1. no. San Francisco. USA; 20100222. Feb. 16, 2010. XP050418872. [retrieved on Feb. 26, 2010] p. 1-p. 3.

Patent Cooperation Treaty, International Search Report and Written Opinion of the International Searching Authority for International Application No. PCT/US2012/063157, Feb. 8, 2013, 13 pages.

3GPP TSG RAN WG1 #60bis, R1-101981 "Enhanced ICIC and Resource-Specific CQI Measurement" Huawei, Beijing, China, Apr. 12-16, 2010, 5 pages.

3GPP TSG RAN WG1 #60bis, R1-102353 "Measurements and feedback extensions for improved operations in HetNets", Qualcomm Incorporated, Beijing, China, Apr. 12-16, 2010, 3 pages.

3GPP ETSI TS 136 213 V10.1.0 (Apr. 2011) Technical Specification LTE, Evolved Universal Terrestrial Radio Access (E-UTRA); Physical layer procedures (3GPP TS 36.213 version 10.1.0 Release 10), 117 pages.

Qualcomm Europe: "Signaling for spatial coordination in DL CoMP", 3GPP TSG-RAN WG1 #58, R1-093141, Aug. 24-28, 2009, Shenzhen, China, all pages.

Motorola: "EUTRA Uplink Macro-diversity", 3GPP TSG RAN WG1 #42, R1-050717, London, U.K., Aug. 29-Sep. 2, 2005, all pages.

NTT DOCOMO: "Downlink Interference Coordination Between eNodeB and Home eNodeB", TSG-RAN Working Group 4 (Radio) meeting #52, R4-093203, Shenzhen, Aug. 24-28, 2009, all pages.

Institute for Information Industry (III), Coiler Corporation: "Interference mitigation for HeNBs by channel measurements", 3GPP TSG RAN WG4 Meeting #52, R4-093196, Shenzhen, China, Aug. 24-28, 2009, all pages.

CMCC: "Downlink interference coordination between HeNBs", 3GPP TSG-RAN WG4 Meeting #52, R4-092872, Shenzhen, China, Aug. 24-28, 2009, all pages.

3GPP TSG RAN WG1 #56bis, R1-091442 "UL Interference Control in the Absence of X2 for Rel9" Qualcomm Europe, Seoul, Korea, Mar. 23-27, 2009, 6 pages.

3GPP TSG RAN WG1 #50bis, R1-074444 "On Inter-cell Interference Coordination Schemes without/with Traffic Load Indication" Ericsson, Shanghai, China, Oct. 8-12, 2007, 6 pages.

Krishnamurthy et al., "Interference Coordination in Heterogeneous Networks Using Wireless Terminals as Relays" U.S. Appl. No. 12/916,871, filed Nov. 1, 2010, 27 pages.

3GPP TSG-RAN WG1 #64, R1-111330, "Considerations on Real-Life DL MIMO Aspects", Ericsson, ST-Ericsson, Barcelona, Spain, May 9-May 13, 2011, all pages.

3GPP TSG-RAN WG1 #66, R1-112091, "Discussion on Real-Life DL MIMO Issues", Ericsson, ST-Ericsson, Athens, Greece, Aug. 22-Aug. 26, 2011, all pages.

LG Electronics, "Consideration on Per-antenna Power Scaling for Full Power Transmission in 4Tx Antennas," 3GPP TSG RAN WG1 Meeting #52bis R1-081265, Mar. 31-Apr. 4, 2008.

Korean Intellectual Property Office, Notice of Preliminary Rejection for Korean Patent Application No. 10-2014-7014974 (related to above-captioned patent application), mailed Jun. 15, 2015.

The State Intellectual Property Office of the People's Republic of China; Chinese office action; Chinese Application No. 201280054701.2; dated May 23, 2016.

* cited by examiner

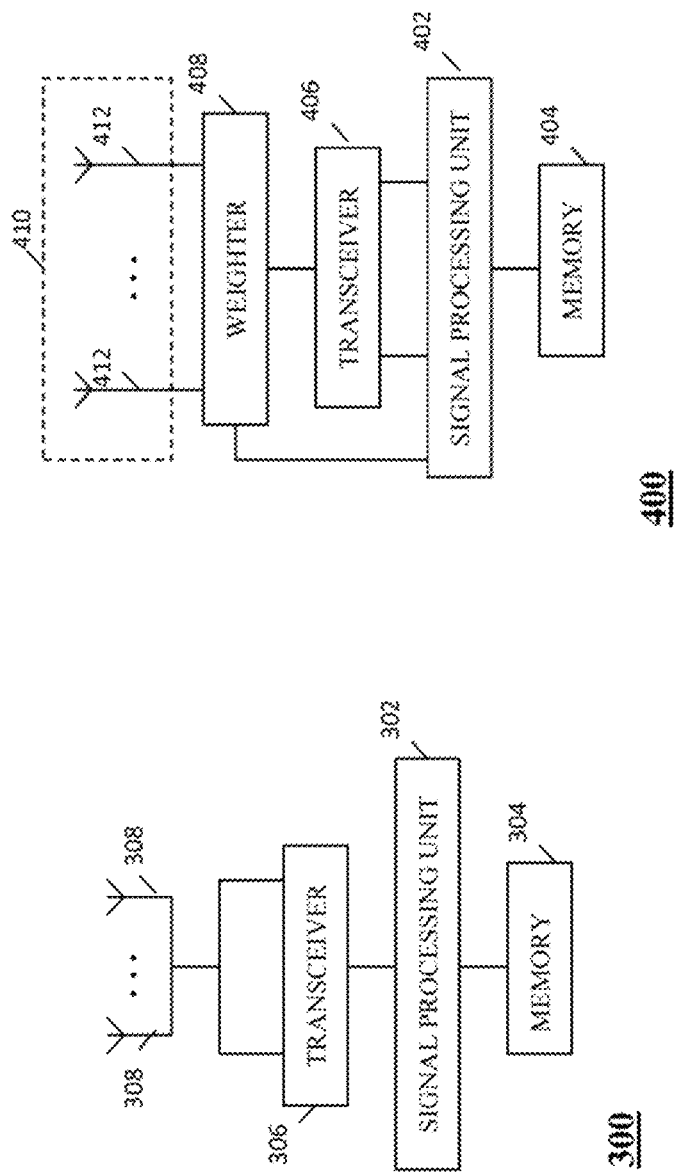

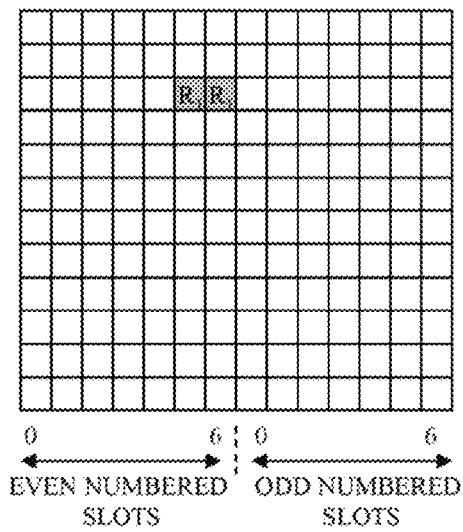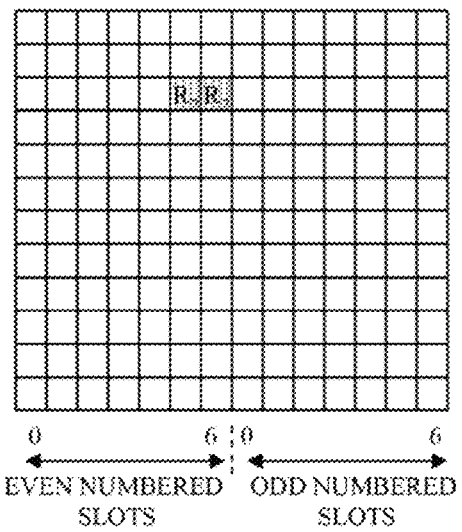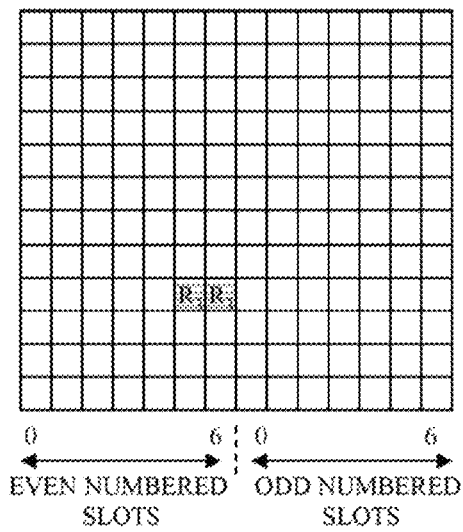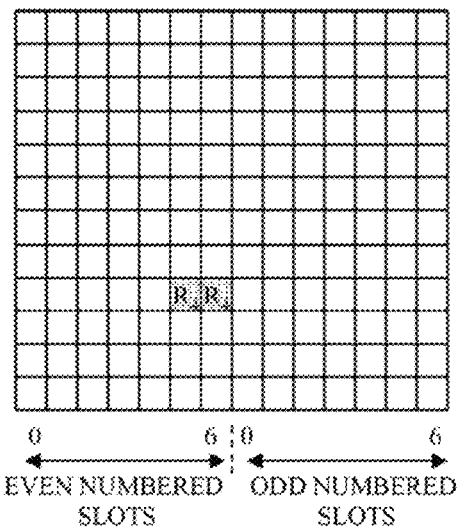
FIG. 13A

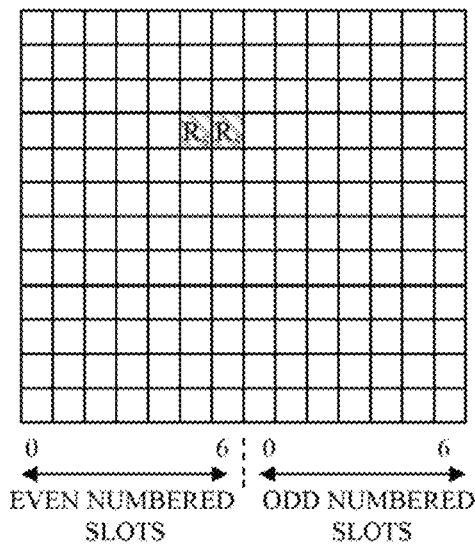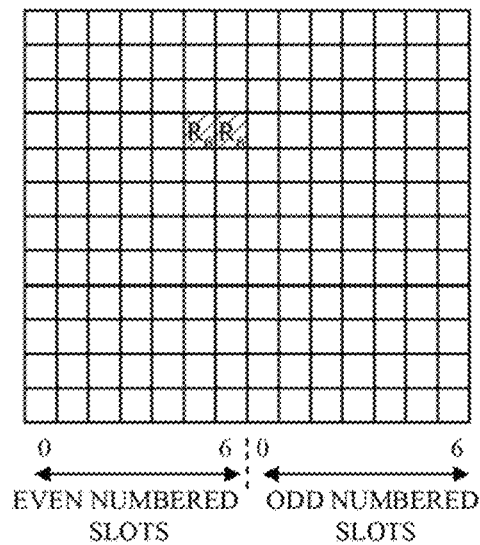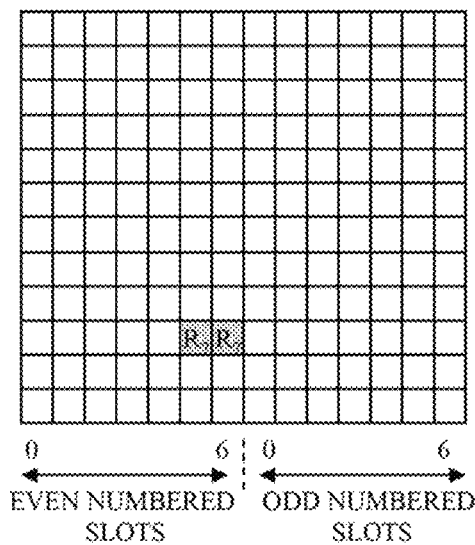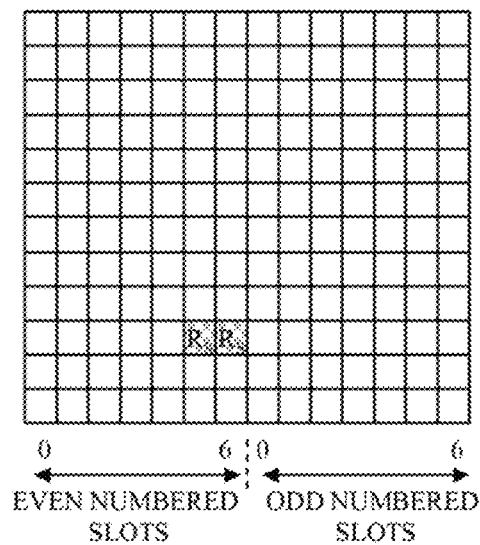
FIG. 13B

METHOD AND APPARATUS FOR RANK ADAPTATION IN AN ORTHOGONAL FREQUENCY DIVISION MULTIPLEXING COMMUNICATION SYSTEM

FIELD OF THE INVENTION

The present disclosure relates generally to wireless communication systems, and more particularly to rank adaptation in an Orthogonal Frequency Division Multiplexing (OFDM) communication system with multiple transmission points such as geographically separated or distributed antennas.

BACKGROUND OF THE INVENTION

Coordinated Multi-Point (CoMP) transmission/reception has been proposed as a promising technology to meet the 3GPP (Third Generation Partnership Project) LTE-Advanced (LTE-A) requirements by improving performance of cell-edge UEs in particular. In CoMP operation, multiple transmission/reception points cooperatively transmit to or receive from one or more user equipment (UEs) to improve performance, especially for those UEs that would otherwise, in the case of downlink, see significant interference from some transmission points if they do not cooperate. A transmission point (TP), termed from the perspective of downlink, generally refers to a radio unit controlled by the scheduler in a base station (referred to as an eNodeB or eNB in LTE). A base station may control a single TP, in which case the TP is the same as a base station or an eNB. In this case, the CoMP operation refers to the case that there is coordination among eNBs. In another network architecture, a base station or eNB may control multiple transmission points (TPs), which often are referred to as radio units or radio heads. In this case, coordination among TPs will happen naturally, and is easier to achieve since they are controlled by a centralized scheduler within the eNB.

In general, CoMP techniques refer to a broad range of coordination mechanisms including interference avoidance. One such technique is joint-transmission type of techniques where antennas from two or more TPs are used together in a multi-antenna (MIMO) transmission to a UE. More generally, one can consider distributed antenna type of deployments where a transmission to a terminal may be from antennas distributed geographically. Clearly, the difference from a conventional MIMO operation is that the antennas are not necessarily co-located.

In some network deployments, TPs may be co-located, in which case it is very feasible to connect them to a single eNB. An example is the well-known three-sector/cell deployment where a single eNB has three service areas, referred to as sectors or cells. In some other deployments, TPs may be geographically separated, in which case they can be controlled by either separate eNBs or a single eNB. In the former case, TPs are typically under the control of separated schedulers that may coordinate in a peer-to-peer fashion. Different types of eNBs with possibly different transmission powers constitute a so-called heterogeneous network. In the case of geographically separated TPs controlled by a single eNB, the TPs, often referred to as remote radio units (RRUs) or remote radio heads (RRHs), connect to a single eNB via optical fiber, and a centralized scheduler controls/coordinates all the TPs.

Each TP, whether co-located or geographically separated, may form its own logical cell, or multiple TPs may form a single logical cell. From a user equipment (UE) perspective, a cell is defined as a logical entity that a UE receives data from and transmits data to, in other words, "serves" the UE. The cell that serves a UE is called the "serving cell." The geographic area covered by the logical entity sometimes also is referred to as a cell, such as when a cell-edge UE is mentioned to describe a UE located at the edge of the coverage area. A cell usually has an associated cell identifier (cell-ID). A cell-ID is typically used to specify the pilot signals (also referred to as reference signals) that may be unique to the cell and scramble the data transmitted to the UEs "attached" to, that is, served by, that cell.

In conventional non-CoMP multi-antenna (MIMO) operation, a single TP, which is the serving cell of a UE, adapts the transmission parameters based on the quality of the link to the UE. In this so-called "link adaptation" as commonly adopted in modern wireless communications, a UE needs to estimate a channel quality of a hypothetical data transmission which is traditionally from a single cell for non-CoMP operation. Channel quality is often represented as a modulation and coding scheme (MCS) that could be received by the UE with an error probability not exceeding a particular threshold. The UE may also feed back some recommendation of spatial transmission parameters, such as transmission rank indication (RI), precoding matrix index (PMI), and the like. In CoMP operation, the transmission from multiple points also needs to adapt to the link condition as seen by the UE.

We will now describe the configuration of various reference signals (or pilot signals) and their use in a communication system. The UE relies on pilot signals (also known as reference signals (RSs)) sent from a serving cell for channel estimation and for channel quality measurements that are reported back to the eNB. Often the reference signals are scrambled with a sequence specific to a cell-ID of that particular serving cell. In order to estimate a channel and to make channel quality measurements, the eNB must have a mechanism that enables the UE to estimate the channel and also measure the interference. The usual mechanism to enable the channel estimation by the UE is for the eNB to send pilot signals from each of the transmit antennas, which essentially sound the channel. A pilot signal is a waveform or sequence known by both the transmitter and receiver. In OFDMA systems, the pilot signals usually correspond to a pilot sequence on a set of time-frequency resource elements (REs) within a time/frequency grid, where a resource element is a subcarrier in OFDM transmission. The UE would then use the pilot signals to compute channel estimates at each subcarrier location by performing interpolation and noise suppression, and to measure a channel quality. Further pilot signals are also needed at the UE to construct the "effective" channel for purpose of coherent demodulation. An effective channel corresponding to one or more data streams or layers of a UE is the precoded/beam-formed channel that a UE's receiver effectively sees applied to a data modulation signal at the receiver.

In Releases 8 and 9 of the 3GPP LTE standards, Common or Cell-Specific reference signals (CRS) (and, in Release 10, Channel State Information Reference Signals (CSI-RSs)), corresponding to a set of CRS ports (CSI-RS ports in Release 10), are sent from an eNB and are intended for all UEs in a cell served by the eNB. The CRS ports could correspond to the set of physical antennas at an eNB or a set of virtualized antennas observable at all UEs served by the eNB. These RSs may be used for channel estimation for channel quality and/or for spatial feedback measurements. A UE can compute and report a recommended PMI from a pre-defined codebook, as well as providing associated RI and CQI (Channel Quality Information, or Indication) feedback, for maximizing the total rate of transmission (or sum CQI) at the UE.

The LTE system is primarily designed, and test cases were setup, with the implicit assumption that the antenna ports represented by the CRS/CSI-RS ports are co-located. The transmitting eNB, in these cases, also is assumed to divide power equally between the different antenna ports. Further, since the antenna ports are assumed to be co-located, an average received power at the UE from each port is expected to be more or less the same. Accordingly, the codebooks and the CSI feedback approaches are defined based on these implicit behaviors. However, in a CoMP communication system, RRUs/RRHs, and corresponding antenna ports, chosen for transmission (for example, the two closest RRUs/RRHs) to a UE may have different path losses. That is, the signals from each RRU/RRH/antenna port may propagate over a completely different path and/or the UE may be much closer to one RRU/RRH/antenna port than the other, with the result that the UE may see a much larger power from one chosen antenna port than another chosen antenna port. This is especially true in the case of small cell or indoor deployments, where a UE may come very close to one of the antennas. In this case, a UE's channel matrix may be ill-conditioned with one dominant singular value, and the UE will report rank 1 as the preferred rank. However, if the SNR (signal-to-noise ratio) from both antenna ports is large, a serving network may expect the UE to support rank 2 at high SNR. This issue could significantly reduce the gain due to suboptimal rank adaptation by the UE, since the peak rate may be reduced by as much as 50%.

Accordingly, a need exists for a proper determination of rank and PMI when a UE may be served by multiple geographically diverse transmission points or antenna ports.

BRIEF DESCRIPTION OF THE DRAWINGS

FIG. 3 is a block diagram of a user equipment of the communication system of FIGS. 1 and 2 in accordance with an embodiment of the present invention.

FIG. 4 is a block diagram of a base station of the communication system of FIGS. 1 and 2 in accordance with an embodiment of the present invention.

FIG. 13A is a depiction of exemplary time-frequency diagrams of an OFDMA PRB employed by the communication system of FIGS. 1 and 2 and that illustrates pilot signal placement within the OFDMA PRB in accordance with another embodiment of the present invention.

FIG. 13B is a continuation of FIG. 13A depicting exemplary time-frequency diagrams of an OFDMA PRB employed by the communication system of FIGS. 1 and 2 and illustrating pilot signal placement within the OFDMA PRB in accordance with another embodiment of the present invention.

Figure 1:
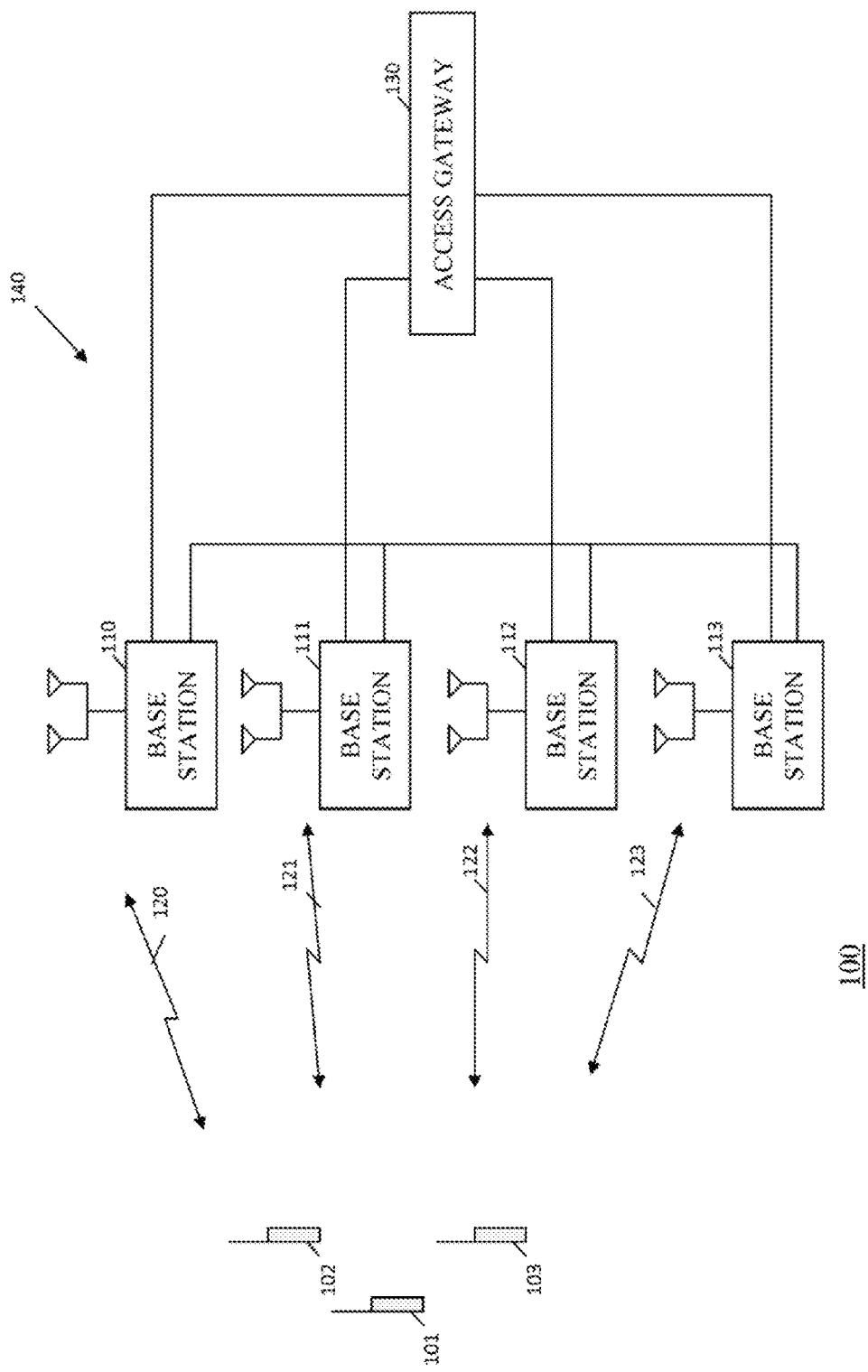
FIG. 1 is a block diagram of a wireless communication system in accordance with an embodiment of the present invention.

Skilled artisans will appreciate that elements in the figures are illustrated for simplicity and clarity and have not necessarily been drawn to scale. For example, the dimensions and/or relative positioning of some of the elements in the figures may be exaggerated relative to other elements to help to improve understanding of various embodiments of the present invention. Also, common but well-understood elements that are useful or necessary in a commercially feasible embodiment are often not depicted in order to facilitate a less obstructed view of these various embodiments of the present invention. It will further be appreciated that certain actions and/or steps may be described or depicted in a particular order of occurrence while those skilled in the art will understand that such specificity with respect to sequence is not actually required. Those skilled in the art will further recognize that references to specific implementation embodiments such as "circuitry" may equally be accomplished via replacement with software instruction executions either on general purpose computing apparatus (for example, a CPU) or specialized processing apparatus (for example, a DSP). It will also be understood that the terms and expressions used herein have the ordinary technical meaning as is accorded to such terms and expressions by persons skilled in the technical field as set forth above except where different specific meanings have otherwise been set forth herein.

DETAILED DESCRIPTION OF THE INVENTION

In order to address the need for a proper determination of rank and PMI when a user equipment (UE) may be served by multiple geographically diverse antenna ports, a communication system is provided that allows for adaptive rank determination, for example, a rank 2 transmission in instances where a rank 1 transmission may be indicated under supported feedback modes in the current standards where no explicit power adaptation can be assumed, for example, where a UE is limited to reporting a rank 1 channel due to a large dynamic range of a signal and associated receiver impairments or due to self-interference of transmissions to the UE and a signal received by the UE from one BS antenna port drowning out a signal received by the UE from another BS antenna port. The communication system provides for the UE to implement rank 2 transmission in such instances by using per-antenna port power control at a base station (BS) serving the UE. In one embodiment, the BS controls the rank determination at the UE by appropriate signaling to the UE of transmit power or power offset related parameters for the UE to use for the recommended rank and transmission parameters determination and feedback.

Generally, an embodiment of the present invention encompasses a method in a UE for communicating with a BS, the method comprising receiving, from the BS, pilot signals on a set of two or more antenna ports and receiving a first power offset configuration indication for the set of two or more antenna ports. The method further comprises determining, based on the known pilot signals and the first power offset configuration indication, a first set of transmission parameters applicable with a first transmission rank for the UE, determining, based on the known pilot signals and a second power offset configuration, a second set of transmission parameters applicable with a second transmission rank for the UE, and conveying, to the BS, information pertaining to the first set of transmission parameters and the second set of transmission parameters.

Another embodiment of the present invention encompasses a method in a UE for communicating with a BS, the method comprising receiving pilot signals corresponding to a set of two or more antenna ports, determining, based on the pilot signals, a first power offset configuration for the set of two or more antenna ports and a first set of transmission parameters applicable with a first transmission rank and the first power offset configuration for the UE, determining, based on the pilot signals and a second power offset configuration for the set of two or more antenna ports, a second set of transmission parameters applicable with a second transmission rank for the UE, and conveying, to the BS, information associated with one or more of the first set of transmission parameters and the second set of transmission parameters.

Yet another embodiment of the present invention comprises a method in a wireless BS, the method comprising indicating a first power offset configuration for a set of antenna ports that are configured for measurement, the first power offset configuration applicable to a first transmission rank, and obtaining feedback information based on the first power offset configuration and a second power offset configuration, wherein the second power offset configuration corresponds to the set of antenna ports and is applicable to a second transmission rank.

Still another embodiment of the present invention comprises a method in a UE for communicating with a BS, the method comprising receiving pilot signals corresponding to two or more antenna ports, determining, based on the pilot signals, a first power offset configuration for the set of two or more antenna ports and a first set of transmission parameters, determining, based on the pilot signals and a default power offset configuration for the set of two or more antenna ports, a second set of transmission parameters, and conveying, to the base station, information associated with one or more of the first set of transmission parameters and the second set of transmission parameters.

Yet another embodiment of the present invention comprises a UE capable of communicating with a BS, the UE comprising a wireless transceiver configured to receive known pilot signals corresponding to a set of two or more antenna ports and receive a first power offset configuration indication for the set of two or more antenna ports and a processor configured to determine, based on the known pilot signals and the first power offset configuration indication, a first set of transmission parameters applicable with a first transmission rank for the UE, determine, based on the known pilot signals and a second power offset configuration, a second set of transmission parameters applicable with a second transmission rank for the UE, and convey, to the BS and via the wireless transceiver, information pertaining to the first set of transmission parameters and the second set of transmission parameters.

Still another embodiment of the present invention comprises a UE capable of communicating with a BS, the UE comprising a wireless transceiver configured to receive known pilot signals corresponding to a set of two or more antenna ports and a processor configured to determine, based on the pilot signals, a first power offset configuration for the set of two or more antenna ports and a first set of transmission parameters applicable with a first transmission rank and the first power offset configuration for the UE, determine, based on the pilot signals and a second power offset configuration for the set of two or more antenna ports, a second set of transmission parameters applicable with a second transmission rank for the UE, and convey, to the BS via the wireless transceiver, information associated with one or more of the first set of transmission parameters and the second set of transmission parameters.

Yet another embodiment of the present invention comprises a BS comprising a wireless transceiver and further comprising a processor configured to indicate a first power offset configuration for a set of antenna ports that are configured for measurement, the first power offset configuration applicable to a first transmission rank, obtain feedback information based on the first power offset configuration and a second power offset configuration, wherein the second power offset configuration corresponds to the set of antenna ports and is applicable to a second transmission rank.

Still another embodiment of the present invention comprises a UE capable of communicating with a BS, the user equipment a wireless transceiver configured to receive known pilot signals corresponding to two or more antenna ports and a processor configured to determine, based on the pilot signals, a first power offset configuration for the set of two or more antenna ports and a first set of transmission parameters, determine, based on the pilot signals and a default power offset configuration for the set of two or more antenna ports, a second set of transmission parameters, and convey, to the base station via the wireless transceiver, information associated with one or more of the first set of transmission parameters and the second set of transmission parameters.

The present invention may be more fully described with reference to FIGS. 1-13B. FIG. 1 is a block diagram of a wireless communication system 100 in accordance with an embodiment of the present invention. Communication system 100 includes multiple user equipment (UE) 101-103 (three shown), such as but not limited to a cellular telephone, a radio telephone, a personal digital assistant (PDA) with radio frequency (RF) capabilities, or a wireless modem that provides RF access to digital terminal equipment (DTE) such as a laptop computer. Communication system 100 further includes an access network 140 comprising multiple base stations (BSs) 110-113 (four shown), such as a Node B, an eNodeB, an Access Point (AP), a Relay Node (RN), or a Base Transceiver Station (BTS) (the terms BS, eNodeB, eNB, and NodeB are used interchangeably herein), that each includes a scheduler (not shown) and an antenna array comprising multiple antennas, that supports Multiple-Input Multiple-Output (MIMO) communications, and that provides communication services, via a corresponding air interface 120-123, to users' equipment (UEs), such as UEs 101-103.

Each BS provides communication services to UEs in a geographic area referred to as a cell or a sector of a cell. Note that a single BS can cover multiple sectors of a cell. The term "cell" is typically used to refer to a sector in this case. More precisely, from a UE perspective, a cell is a logical entity that a UE is communicating with (that is, serves a UE). The cell that serves a UE is called the "serving cell," as opposed to a "non-serving" or potentially interfering cell. A cell usually corresponds to an associated cell identifier (cell-ID). A cell-ID is typically used to specify the pilot signals (also referred to as reference signals (RSs)) and to scramble the data transmitted to the UEs "attached" to (that is, served by) that cell. Each cell can have a single transmission point (TP) in which case the term cell and TP can used interchangeably. Each cell may have multiple TPs (refer to FIG. 2) in which case they are not equivalent.

Each air interface 120-123 comprises a respective downlink and a respective uplink. Each of the downlinks and uplinks comprises multiple physical communication channels, including multiple control/signaling channels and multiple traffic channels. Each BS of the multiple BSs 110-113 is in communication with the other BSs of the multiple BSs via one or more of an access network gateway 130 and an inter-BS interface that may comprise one or more of a wireline link and a wireless link of all of the BSs and via which each BS may broadcast to the other BSs. Access network 140 further includes access network gateway 130. Access network gateway 130 provides access for each of BSs 110-113 to other parts of an infrastructure of communication system 100 and to each other, and may be, for example but not limited to, any one or more of a Radio Network Controller (RNC), a mobile switching center (MSC), a Packet Data Service Node (PDSN), or a media gateway.

Figure 2:
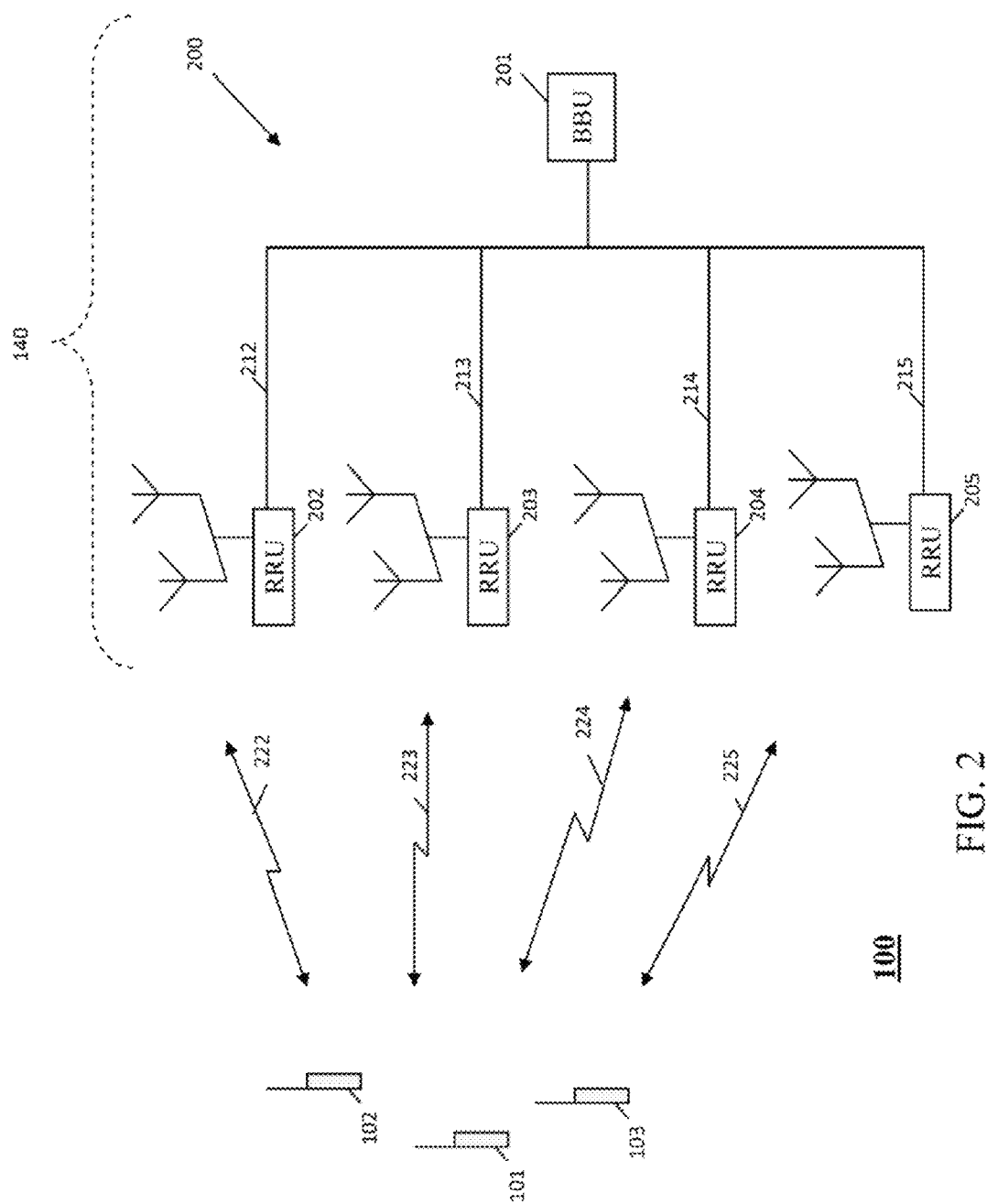
FIG. 2 is a block diagram of a wireless communication system in accordance with another embodiment of the present invention.

Referring now to FIG. 2, a block diagram is provided of wireless communication system 100 in accordance with another embodiment of the present invention. In communication system 100 as depicted in FIG. 2, access network 140 includes a BS 200 whose functionality is distributed among a Base Band Unit (BBU) 201 and multiple Remote Radio Units (RRUs) 202-205 (four shown) coupled to the BBU. Each RRU 202-205 comprises an antenna array that includes one or more antennas and further includes other functionality, and is responsible for receiving and transmitting the radio frequency signals from and to a UE, such as UEs 101-103, residing in a coverage area of the RRU via a corresponding air interface 222-225. Each RRU 202-205 can also each be referred to as a TP that is connected to the same BS 200. Each air interface 222-225 comprises a respective downlink and a respective uplink. Each of the downlinks and uplinks comprises multiple physical communication channels, including multiple control/signaling channels and multiple traffic channels. BBU 201 is coupled to each of the multiple RRUs 202-205 by a corresponding backhaul link 212-215, for example, a wireless link or a wired link such as a fiber optic network. Typically the scheduler resides with a BBU.

In still other embodiments of the present invention, communication system 100 may comprise system that is a combination of the embodiments depicted in FIGS. 1 and 2.

TPs may be co-located, in which case it is very feasible to connect them to a single BS. An example is a typical three-sector deployment where a single BS controls three service areas referred to as sectors/cells. TPs may be geographically separated, hence the term "remote radio units" (RRUs) or "remote radio heads" (RRHs). An example of geographically separated TPs is a deployment scenario of a heterogeneous network that is comprised of different types of BSs with varying transmission powers.

A UE may receive transmission from a single RRU or more than one RRU. For example, a UE, such as UE 101, may be located in a coverage area served by RRU pair 203, 204 and could receive joint transmissions from these two RRUs. In this case, RRUs 203 and 204 may be referred to as serving RRUs and RRU 205 as a non-serving RRU (or potentially interfering RRU), all from UE 101's perspective only. Similarly UE 103 may receive transmissions from RRU pair 204 and 205. But UE 103 may be closer to RRU 204 and thus a central scheduler may decide to use only RRU 204 to serve UE 103. BS 200 may determine the serving and non-serving RRUs for each UE considering the performance of the part of network 100 in its control, based on some UE feedback measurements. Such determinations may be semi-static or dynamic.

Referring now to FIGS. 3 and 4, block diagrams are provided of a UE 300, such as UEs 101-103, and a BS 400, such as BSs 110-113 and 200, in accordance with various embodiments of the present invention. Each of UE 300 and BS 400 includes a respective processor 302, 402, such as one or more microsignal processing units, microcontrollers, digital signal signal processing units (DSPs), microprocessors, combinations thereof or such other devices known to those having ordinary skill in the art. The particular operations/functions of processors 302 and 402, and respectively thus of UE 300 and BS 400, are determined by an execution of software instructions and routines that are stored in a respective at least one memory device 304, 404 associated with the signal processing unit, such as random access memory (RAM), dynamic random access memory (DRAM), and/or read only memory (ROM) or equivalents thereof, that store data and programs that may be executed by the corresponding processor. Processor 402 also implements any scheduling functions (a scheduler) performed by the BS based on instructions and routines that are stored in the at least one memory device 404 of the BS. Each of at least one memory devices 304, 404 also maintains codebooks, such as PMI codebooks or extended PMI codebooks, lists of power offsets, rank indications, and any other parameters useful for the UE and BS to perform their functions as described herein.

Each of UE 300 and BS 400 further includes a respective one or more radio frequency (RF) transceivers 306, 406 coupled to the processor 302, 402 of the UE or BS and for wirelessly communicating with a BS and UE, respectively, via an intervening air interface. For example, BS 400 may include multiple transceivers, that is, a transceiver at each RRU 202-205. Each transceiver 306, 406 includes receiving circuitry (not shown) and transmitting circuitry (not shown) for receiving and transmitting signals over an air interface, such as air interfaces 120-123 and 222-225. UE 300 includes one or more antennas 308 and, in the event the UE comprises multiple antennas, may support MIMO communications. BS 400 further includes one or more arrays 410 of antennas, for example, BS 400 may include multiple antenna arrays, that is, array at each RRU 202-205, which arrays each are in communication with a corresponding transceiver 306 and which arrays each comprises multiple antennas 412. By utilizing an antenna array to transmit signals to a UE located in a coverage area of the BS, such as a cell or sector serviced by the antenna array, the BS is able to utilize MIMO techniques for the transmission of the signals.

BS 400 further includes a weighter 408 in association with each transceiver of the one or more transceivers 406, such as a precoder or any other type of signal weighter, that is in communication with processor 402 and that is interposed between a corresponding antenna array 410 and a corresponding transceiver 406. In another embodiment of the present invention, weighter 408 may be implemented by processor 402. Weighter 408 weights signals applied to the multiple antennas 412 of a corresponding antenna array 410 based on channel state information (CSI) fed back by a UE, for example, codebook feedback such as a codebook index and a rank index, statistical feedback such as a covariance matrix or any other type of matrix, eignevectors, or channel quality mean and variance, a received signal quality information, a channel frequency response, or any other type of channel feedback known in the art, in order to predistort and beamform the signals for transmission to the UE over the downlink of the intervening air interface.

When weighter 408 comprises a precoder, each of UE 300 and BS 400 may further maintain, in at least one memory devices 304 and 404 and/or in precoder 408, a precoding matrix, which precoding matrix comprises multiple sets of matrices and wherein each set of matrices is associated with a combination of antennas for downlink transmission and with weights applicable to each antenna. Precoding matrices are well-known in the art and will not be described in greater detail. Based on the channel conditions measured by a UE, the UE reports back a precoding metric, preferably a Precoding Matrix Index (PMI), for a group of resource elements (REs) where an RE is a time-frequency resource such as one (1) subcarrier in frequency by one (1) OFDM symbol in time. In determining a precoding metric for a group of REs, the UE computes a set of complex weights based on the measured channel conditions. The set of complex weights can be Eigen Beamforming vectors derived from downlink reference signal measurements. The complex weights are mapped to a set of already defined vectors, that it, to a nearest vector of the set of already defined vectors, to produce a precoding vector. The UE then conveys the index of the precoding vector selected by the UE using an uplink control channel.

The embodiments of the present invention preferably are implemented within UEs 101-103 and BSs 110-113 and 200, and more particularly with or in software programs and instructions stored in the at least one memory devices 304, 404 and executed by processors 302, 402 of the UEs and BSs. However, one of ordinary skill in the art realizes that the embodiments of the present invention alternatively may be implemented in hardware, for example, integrated circuits (ICs), application specific integrated circuits (ASICs), and the like, such as ASICs implemented in one or more of UEs 101-103 and BSs 110-113 and 200. Based on the present disclosure, one skilled in the art will be readily capable of producing and implementing such software and/or hardware without undo experimentation.

Communication system 100 comprises an Orthogonal Frequency Division Multiple Access (OFDMA) modulation scheme for transmitting data over air interface 206, wherein a frequency channel, or bandwidth, is split into multiple physical resource blocks (PRBs) during a given time period. Each physical resource block (PRB) comprises multiple orthogonal frequency sub-carriers over a given number of OFDM symbols, that are the physical layer channels over which traffic and signaling channels are transmitted in a TDM or TDM/FDM fashion. A communication session may be assigned a PRB or a group of PRBs for an exchange of bearer information, thereby permitting multiple users to transmit simultaneously on the different PRBs such that each user's transmission is orthogonal to the other users' transmissions. A PRB also may be assigned to multiple users in which case the users are no longer orthogonal but they can be separated based on spatial signatures of the individual transmit weights.

In addition, communication system 100 preferably operates according to the Third Generation Partnership Project (3GPP) Long Term Evolution-Advanced (LTE-A) standards, which standards specify wireless telecommunications system operating protocols including radio system parameters and call processing procedures, and implements coordinated multipoint transmission (CoMP) and/or joint MIMO transmission from non-colocated (or distributed) antennas. However, those who are of ordinary skill in the art realize that communication system 100 may operate in accordance with any wireless telecommunication standard employing an Orthogonal Frequency Division Multiplexing (OFDM) modulation scheme, such as but not limited to other 3GPP communication systems employing channel estimation and feedback of channel interference measurements, a 3GPP2 (Third Generation Partnership Project 2) Evolution communication system, for example, a CDMA (Code Division Multiple Access) 2000 1×EV-DV communication system, a Wireless Local Area Network (WLAN) communication system as described by the IEEE 802.xx standards, for example, the 802.11a/HiperLAN2, 802.11g, or 802.20 standards, or a Worldwide Interoperability for Microwave Access (Wi-MAX) communication system that operates in accordance with the IEEE (Institute of Electrical and Electronics Engineers) 802.16 standards, including 802.16e and 802.16m.

Among the signals being multiplexed and transmitted to a UE 101-103 from each of multiple coverage areas, such as by the multiple BSs 110-113 and/or by the multiple RRUs 202-205 associated with BS 200, are reference or pilot signals which may be multiplexed with other control information and user data. Pilot signals, and more particularly Channel State Information-Reference Signals (CSI-RSs), are sent from antennas of a serving BS or RRU that may transmit to a UE in order for the UE to determine channel state information (CSI) that is fed back to a serving BS. Additionally, with respect to CoMP transmissions, the UE may need to determine CSI for multiple TPs or multiple BSs as well and the corresponding CSI-RSs are also configured for that UE.

In Releases 8 and 9 of the 3GPP LTE standards, Common or Cell-Specific reference signals (CRS) (or, in Release 10, Channel State Information Reference Signals (CSI-RSs)), corresponding to a set of CRS ports (CSI-RS ports in Release 10), are sent from a BS and are intended for all UEs in a cell served by the BS. CRS may be used for both demodulation and channel feedback measurements at a UE. In Release-10 additional reference signals are defined, namely Channel State Information Reference Signals (CSI-RSs), which primarily are used for channel feedback measurements at the UE. Demodulation is supported by demodulation reference signals (also referred to as UE specific RS, demodulation RS (DMRS), dedicated RS), which typically are sent in the UE's data allocation region.

Figure 5:
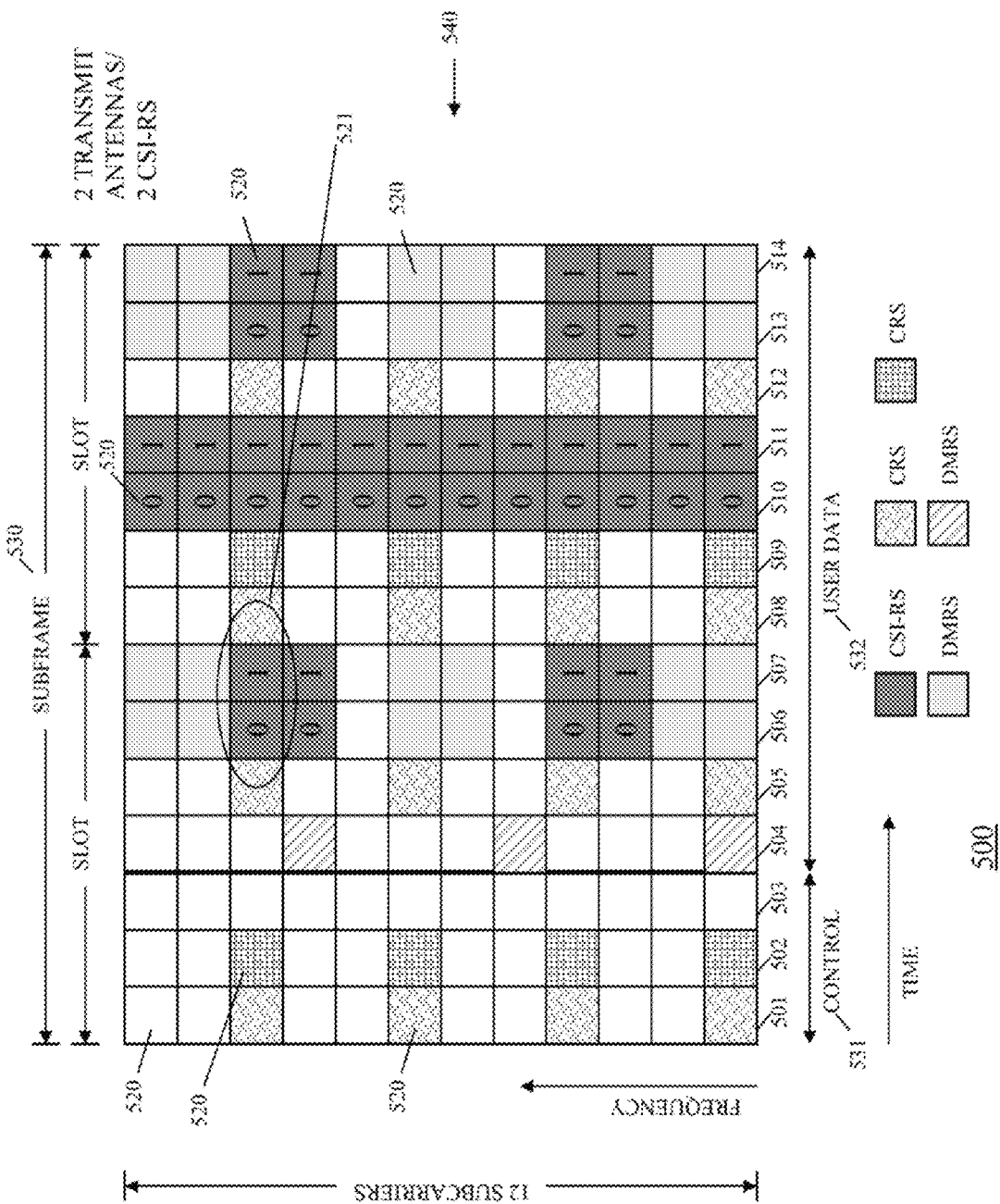
FIG. 5 is an exemplary time-frequency diagram of an OFDMA physical resource block (PRB) employed by the communication system of FIGS. 1 and 2 and that illustrates pilot signal placement within the OFDMA PRB in accordance with an embodiment of the present invention.
Figure 6:
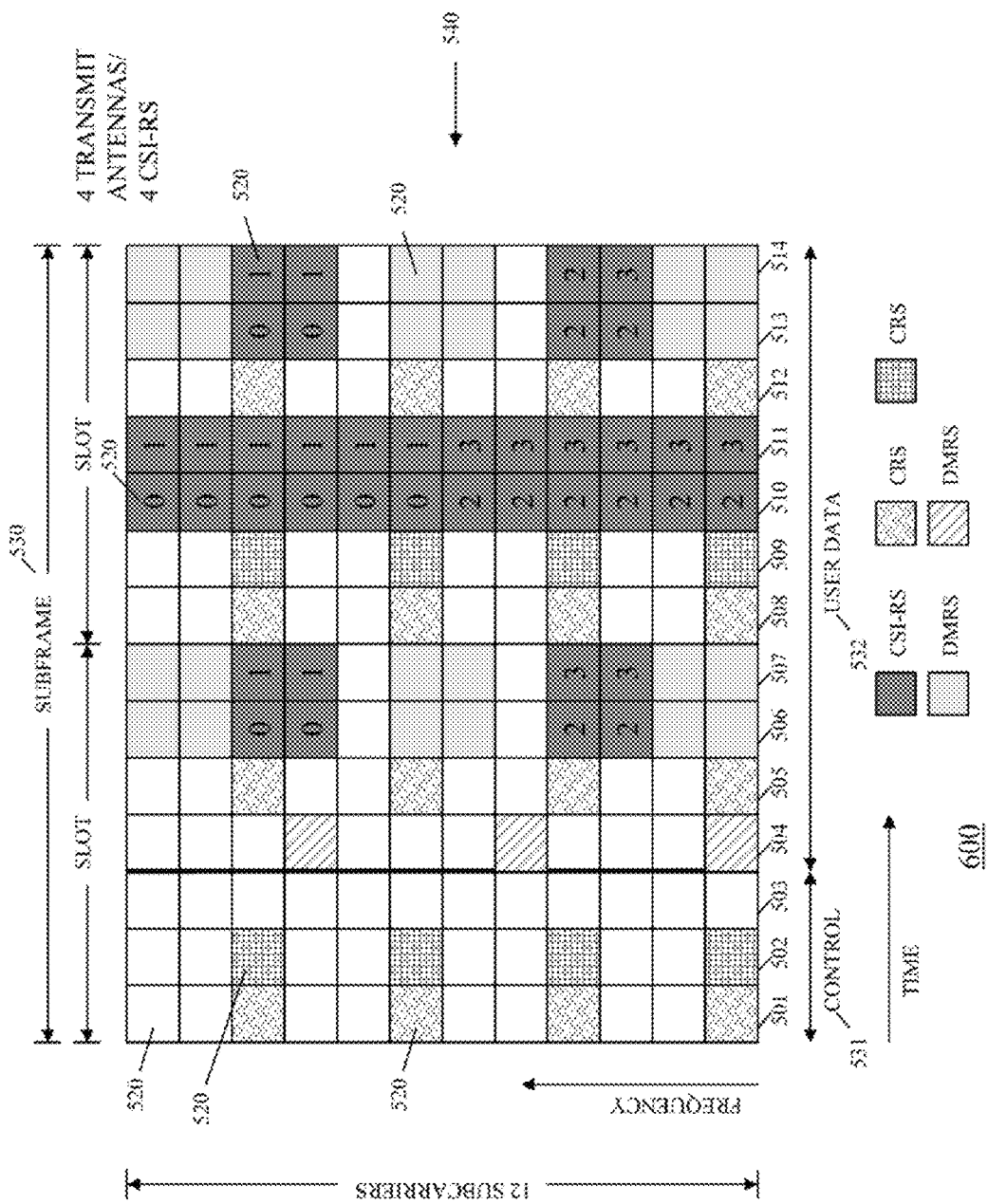
FIG. 6 is an exemplary time-frequency diagram of an OFDMA physical resource block (PRB) employed by the communication system of FIGS. 1 and 2 and that illustrates pilot signal placement within the OFDMA PRB in accordance with another embodiment of the present invention.
Figure 7:
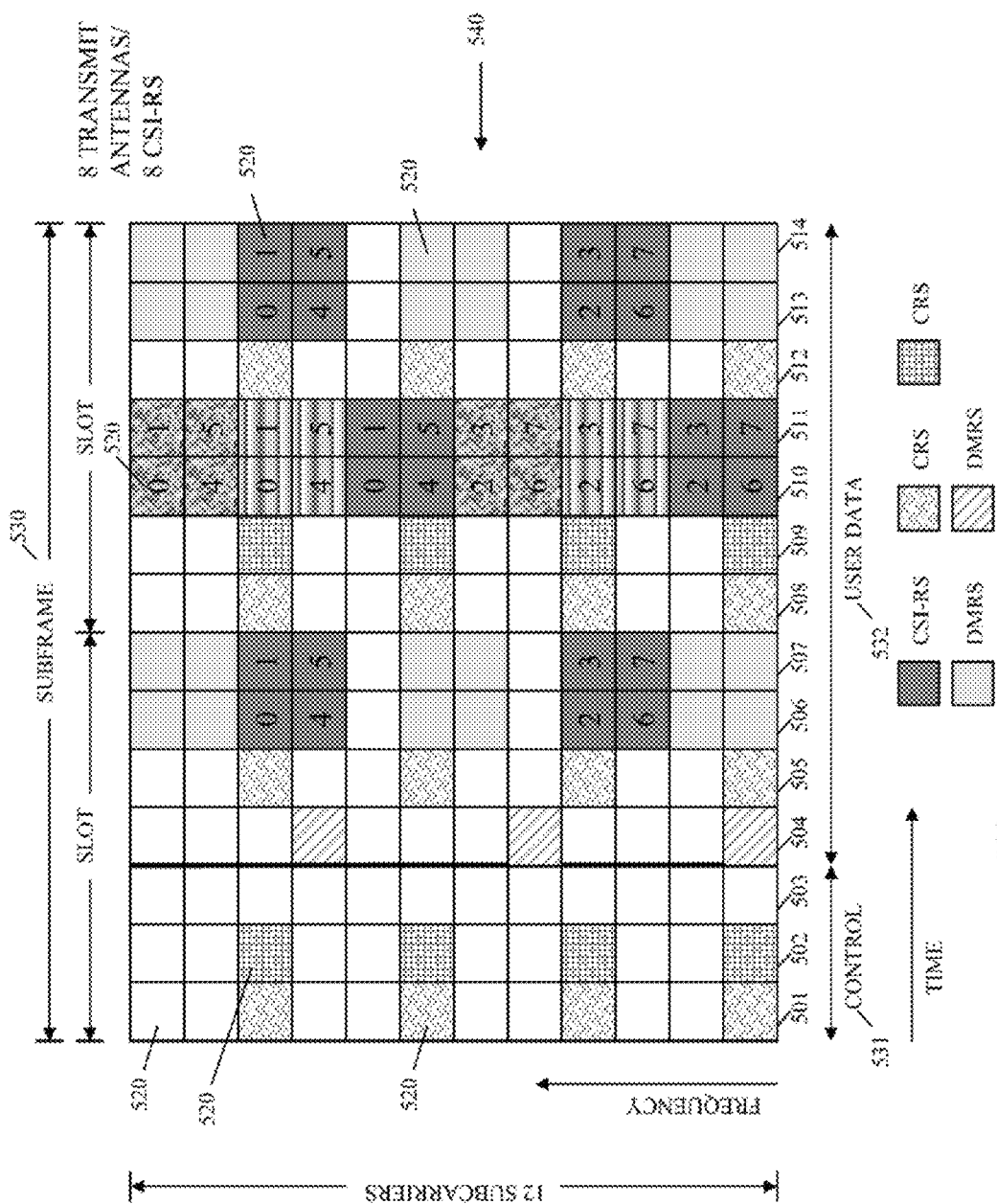
FIG. 7 is an exemplary time-frequency diagram of an OFDMA PRB employed by the communication system of FIGS. 1 and 2 and that illustrates pilot signal placement within the OFDMA PRB in accordance with another embodiment of the present invention.

We will now describe the details of CSI-RS (Channel State Information—Reference Signals) configurations, which essentially are pilot signal used by a BS to set-up channel feedback measurements at a UE. Referring now to FIGS. 5, 6, and 7, time-frequency diagrams 500, 600, 700 respectively are provided that depict exemplary distributions of pilot signals, and particularly CSI-Reference Signals (CSI-RSs), in a OFDMA PRB-pair 540 and over a subframe 530 that may be employed by communication system 100 in accordance with various embodiments of the present invention. The terms 'pilot signals' and 'reference signals' are used interchangeably herein. A vertical scale of each time-frequency diagram 500, 600, 700 depicts multiple blocks of frequency, or frequency bins, (frequency subcarriers) of the subframe that may be allocated. A horizontal scale of each time-frequency diagram 500, 600, 700 depicts multiple blocks of time (in units of OFDM symbols) 501-514 of the subframe that may be allocated. Subframe 530, depicted in time-frequency diagrams 500, 600, and 700, comprises a physical resource block-pair (PRB-pair) 540, wherein the PRB comprises 12 OFDM subcarriers over a time slot comprising seven (7) OFDM symbols. In turn, PRB-pair 540 is divided into multiple resource elements (REs) 520, wherein each RE is a single OFDM subcarrier, or frequency bin, on a single OFDM symbol. Further, PRB-pair 540 may comprise a control region 531, for the transmission of control data, and a user data region 532, for the transmission of user data.

PRB-pair 540 includes multiple potential Channel State Information (CSI) reference signal configurations, which configurations define which resource elements (REs) of the PRB are allocated to the CSI Reference Signals (CSI-RSs). A CSI reference signal configuration is used to refer to a set of resources (REs in an OFDM system) that may be used to transmit a set of CSI-RSs corresponding to a group of one or more transmit antennas. An exemplary operation is described based on the Release 10 specification of LTE. In the current Release 10 version of the 3GPP LTE specification, for a given number (or group) of transmit (BS) antenna ports, multiple CSI reference signal configurations are defined, and a BS may chose one of the available configurations. As used herein, references to transmit antenna ports are intended to refer to BS antenna ports used to transmit signals on a downlink. For example, and referring now to FIG. 5, exemplary CSI reference signal configurations are depicted with groupings of two transmit antenna ports. Each pair of ports [0, 1], are multiplexed with time domain CDM (Code Division Multiplexing). Such a pair [0, 1] corresponds to two antenna ports (for example, '0' and '1') that share the two corresponding reference elements (REs) 521 with a simple CDM code of [1, 1] and [1, −1]. As seen in FIG. 5, any of the potentially 20 CSI reference signal configurations (each indicated by a pair of resource elements labeled (0,1), for example, pair 521) can be configured for measurements on two antenna ports at a UE. PRB-pair 540 also includes non-CSI-RS pilot signals that are distributed in control region 531 and/or user data region 532 of the PRB-pair. For example, the shaded REs of PRB-pair 540 are reserved for, that is, allocated to, other reference symbols, either a common reference signal (CRS) or a dedicated reference signal (DRS). These other reference signals may be present but are not necessarily used for channel estimation or interference measurements by a UE in an LTE-A communication system.

The CSI-RS configurations depicted in FIGS. 5, 6, and 7 are naturally valid for BSs with 2, 4, or 8 transmit antenna ports respectively. For example, FIG. 6 depicts exemplary CSI-RS configurations with groupings of four transmit antenna ports. That is, in FIG. 6, two CDM pairs of REs (0,1) and (2,3) (not necessarily adjacent to each other) are mapped by a single CSI-RS configuration (a redefined set of configurations are used for four transmit antenna ports) and corresponds to four antenna ports. By way of another example, FIG. 7 depicts an exemplary CSI-RS configuration with groupings of eight transmit antenna ports. That is, in FIG. 7, four CDM pairs of REs (0,1), (2,3), (4,5), and (6,7) (not necessarily adjacent to each other) are mapped by a single CSI-RS configuration corresponding to eight antenna ports. As depicted in FIGS. 5, 6, and 7, in setting up CSI-RS reference signals for a UE corresponding to two, four and eight antenna ports, one of 20, 10, and 5 available configurations, respectively, can be used. The information of one or more CSI-RS configurations corresponding to a particular BS or a particular transmission point or multiple BS or multiple transmission points is typically conveyed by higher-layer signaling. As depicted in FIGS. 5, 6, and 7, CSI-RS corresponding to an antenna port is allocated to a resource element (RE) pair in user data region 532, and more particularly to one of the RE pairs associated with OFDM symbols 506-507, 510-511, and 513-514. As also depicted in FIGS. 5, 6, and 7, one antenna may transmit CSI-RS over any of the possible 20 RE pairs corresponding to 20 CSI reference signal configurations. Typically, in a single cell transmission, only up to four CSI-RS RE pairs, and thus a total of 8 REs, are needed to support up to a maximum of eight transmit antennas.

In CoMP or joint MIMO operations, as briefly described above, one or more TPs, and corresponding antenna ports, that are connected to one or more BSs may cooperatively transmit to a UE. In joint Transmission (JT), a set of transmit antenna ports jointly serving a UE, typically TPs or RRUs associated with a same central base station controller or a BS, may jointly transmit data and reference symbols (RSs), such as CSI-RSs, intended for the UE. Currently, the 3GPP LTE standards provide that a BS divides transmit power equally among the different antenna ports, that is, each such antenna port transmits to the UE at a same transmit power level. However, a BS may set up CSI-RSs such that the corresponding antenna ports conveyed by the CSI-RS configurations may correspond to geographically separated or distributed antennas.

Based on a received RS, such as a CSI-RS, a UE determines a channel state, that is, performs a CSI calculation. The signal model assumed in a CSI calculation by the UE is as follows for a 2×2 MIMO example, $$\begin{bmatrix} y_1 \\ y_2 \end{bmatrix} = \begin{bmatrix} h_{11} & h_{12} \\ h_{21} & h_{22} \end{bmatrix} \begin{bmatrix} v_{11} & v_{12} \\ v_{21} & v_{22} \end{bmatrix} \begin{bmatrix} s_1 \\ s_2 \end{bmatrix} + \begin{bmatrix} n_1 \\ n_2 \end{bmatrix}$$

$$Y = HVs + n$$

where Y is a received signal, that is, $y_i$ is a signal received at the $i^{th}$ antenna of the UE (two receive (UE) antennas are assumed here), H is a 2×2 channel matrix measured by the two receive antennas (that is, i where i=1, 2) at the UE (also referred to herein as UE, or receive, antenna ports) on the two BS reference signal antenna ports, that is, $h_{ij}$ is the channel between the $i^{th}$ UE (receiving) antenna and the $j^{th}$ BS (transmit) antenna port, V is the precoder matrix applied to such transmissions, s is the symbol matrix, that is, $s_i$ is an $i^{th}$ transmitted symbol at the BS, and n is the AWGN with variance $\sigma^2$, that is, $n_i$ is the noise included in the signal $y_i$ received at the $i^{th}$ UE antenna. In this model, it is implicitly assumed that symbols $s_1$ and $s_2$ are of equal power from a unit power normalized constellation and the actual transmission power and the channel effects are captured in H itself for convenience.

The above equation can be written equivalently as $$\begin{bmatrix} y_1 \\ y_2 \end{bmatrix} = \begin{bmatrix} \rho_1 h_{11} & \rho_2 h_{12} \\ \rho_1 h_{21} & \rho_2 h_{22} \end{bmatrix} \begin{bmatrix} v_{11} & v_{12} \\ v_{21} & v_{22} \end{bmatrix} \begin{bmatrix} s_1 \\ s_2 \end{bmatrix} + \begin{bmatrix} n_1 \\ n_2 \end{bmatrix}, \rho_1 = \rho_2 = 1$$

$$Y = H(\vec{\rho})Vs + n$$

where $\rho_j$ is the "transmit power" of the signal transmitted on the $j^{th}$ BS (transmitting) antenna port. This latter equation captures an equivalent equation (equivalent to the preceding equation) that expresses channel dependence on power $\vec{\rho}$ on each transmit antenna port (which, under current standard conventions, is assumed to be unity). As reference, unity may refer to the BS transmitting with transmit power equally allocated to each of the antennas.

Now, assume that separation and location of the BS antennas, and corresponding antenna ports, with respect to the UE, is such that the average channel gain differs by 10 dB between the BS antennas (two, in this example). The above signal model then can be rewritten as $$\begin{bmatrix} y_1 \\ y_2 \end{bmatrix} = \begin{bmatrix} \rho_1 h_{11} v_{11} + \rho_2 h_{12} v_{21} & \rho_1 h_{11} v_{12} + \rho_2 h_{12} v_{22} \\ \rho_1 h_{21} v_{11} + \rho_2 h_{22} v_{21} & \rho_1 h_{21} v_{12} + \rho_2 h_{22} v_{22} \end{bmatrix} \begin{bmatrix} s_1 \\ s_2 \end{bmatrix} + \begin{bmatrix} n_1 \\ n_2 \end{bmatrix},$$

$$\approx \begin{bmatrix} \rho_1 h_{11} v_{11} & \rho_1 h_{11} v_{12} \\ \rho_1 h_{21} v_{11} & \rho_1 h_{21} v_{12} \end{bmatrix} \begin{bmatrix} s_1 \\ s_2 \end{bmatrix} + \begin{bmatrix} n_1 \\ n_2 \end{bmatrix}$$

$$\rho_1 = \rho_2 = 1, \frac{\|H(:,1)\|^2}{\|H(:,2)\|^2} = 10$$

where $\|H(:,1)\|^2$ is the channel gain of a signal transmitted via BS (transmit) antenna 1 (and corresponding antenna port) and $\|H(:,2)\|^2$ is the channel gain of a signal transmitted via BS (transmit) antenna 2 (and corresponding antenna port). The approximation is due to the assumption that the factors $\rho_2 h_{12} v_{21}$, $\rho_2 h_{22} v_{21}$, $\rho_2 h_{12} v_{22}$, and $\rho_2 h_{22} v_{22}$, are relatively small and can be ignored. Such approximation may inherently take place in a UE receiver, due to UE receive impairments and finite precision/bit-width or receiver dynamic range. In other words, the dropped factors are comparable to other noise terms in the receiver like quantization noise.

This is an equation of essentially a rank 1 channel, that is, as far as a processing precision of the UE (receiving device) is concerned. With floating point precision and assuming an ideal receiver, a rank 2 may be obtained; however, due to the large dynamic range of the signal and associated receiver impairments, the channel is approximated as rank 1. Clearly, in this case, the UE (receiving device) would recommend a rank 1 transmission.

However, if one further assumes that the SNRs (signal-to-noise ratios) are high for signals received from both BS antennas at both UE antennas, that is, $$\frac{\|H(:,1)\|^2}{N_0} \gg 1, \frac{\|H(:,2)\|^2}{N_0} \gg 1$$

then in this case, due to the limitation of channel and equal transmit power hypothesis made at the UE, the rank is limited to 1 regardless of the SNR (signal-to-noise ratio). One may observe that this is essentially due to self-interference of transmissions to the UE and a signal received by the UE from one of the BS antenna ports drowning out the signal received by the UE from the other of the BS antenna ports.

Nevertheless, while a rank 1 transmission is indicated in such circumstances, a rank 2 transmission may be desirable (and possible) from a capacity perspective, while satisfying power constraints at the transmitter. In order to allow for adaptive rank determination and a rank 2 transmission in such instances, where with current standard support the UE is limited to reporting a rank 1 channel, communication system 100 provides for a UE to implement rank 2 transmission by using per-antenna port power control at the BS for the UE. One approach is for the BS to explicitly control the rank determination at the UE by appropriate signaling to the UE of transmit power or power offset related parameters for the UE to use for the recommended rank and transmission parameters determination and feedback.

Figure 8:
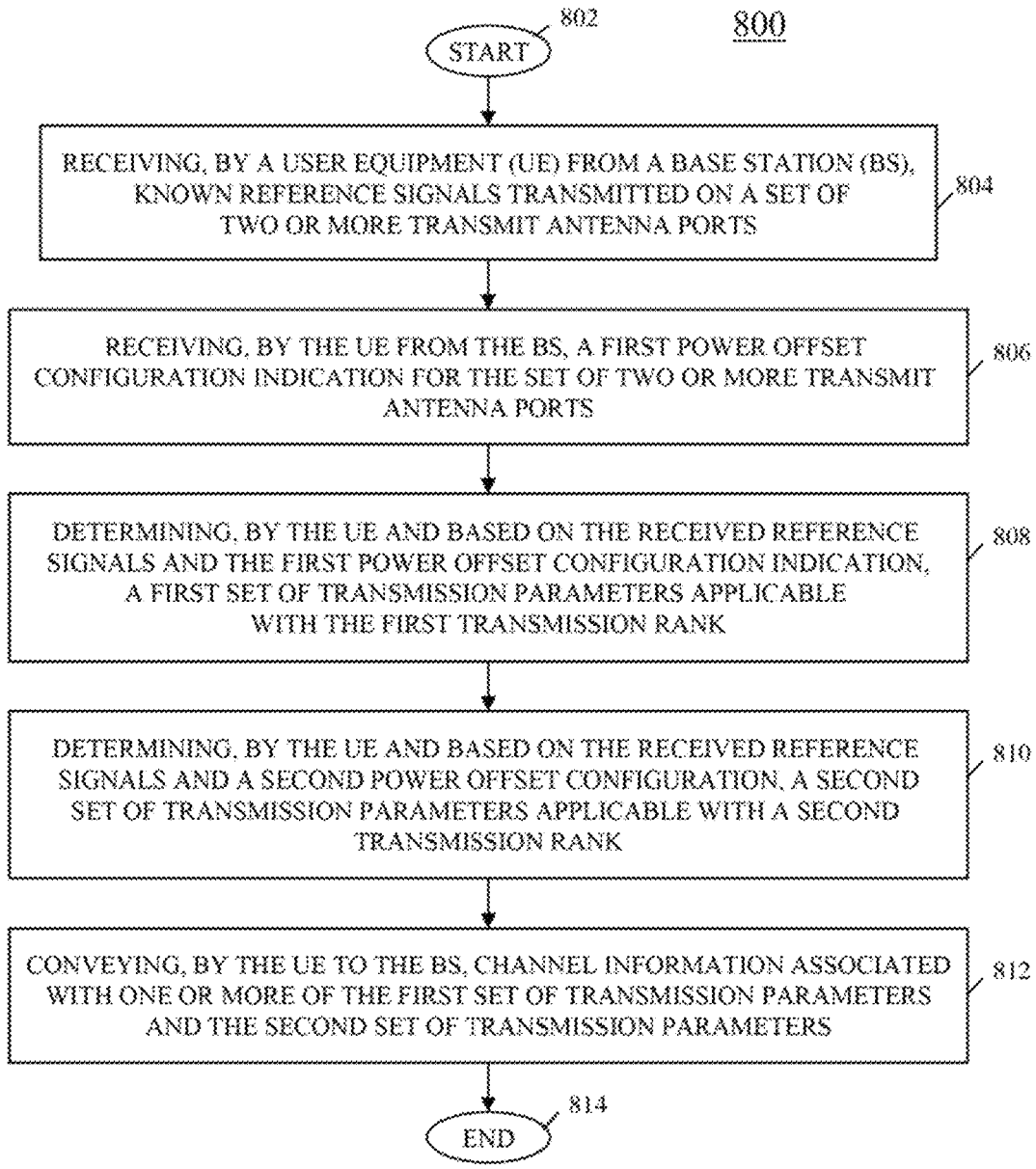
FIG. 8 is a logic flow diagram that illustrates a method of rank adaptation by communication system of FIGS. 1 and 2 in accordance with various embodiments of the present invention.

Referring now to FIG. 8, a logic flow diagram 800 is depicted that illustrates a method of rank adaptation by communication system 100 in accordance with various embodiments of the present invention. Logic flow 800 begins (802) when a serving BS, such as BSs 110-113 and 200, transmits (804) to a UE, such as UEs 101-103, and the UE receives, known reference signals (RSs), for example, pilot signals, on a set of two or more transmit antenna ports. The BS further transmits (806) to the UE, and the UE receives, a first power offset configuration indication for the set of two or more antenna ports, that is, an indication of a first power offset configuration for the set of two or more antenna ports. A power offset configuration as used herein refers to a set of the power offsets corresponding to each antenna ports of the two or more antenna ports. Such first power offset configuration indication may be represented with one or more candidate power offsets of multiple possible power offsets, wherein each candidate power offset applies to one or more antenna ports of the set of two or more antenna ports. For example, in one such embodiment of the present invention, the BS may explicitly indicate the first power offset configuration. Further the first power offset configuration may be explicitly indicated to be applicable with a first transmission rank, for example, rank 2 (however, the first transmission rank could just as well be rank 1) or it can be indicated as a rank independent configuration.

Based on the received RSs and first power offset configuration indication, the UE determines (808) a first set of transmission parameters applicable with the first transmission rank for the UE. Further, based on the received RSs and a second power offset configuration, the UE determines (810) a second set of transmission parameters applicable with a second transmission rank for the UE, for example, rank 1 (however, the second transmission rank could just as well be rank 2 if the first transmission rank is rank 2; one of ordinary skill in the art realizes that references herein to each of a first transmission rank and a second transmission rank could be any transmission rank, so long as they are different transmission ranks). Similar to the first power offset configuration, the second power offset configuration may be associated with one or more candidate power offsets of multiple possible power offsets, wherein each candidate power offset applies to one or more antenna ports of the set of two or more antenna ports. For example, the first and second sets of transmission parameters may each comprise one or more of a precoding matrix index (PMI) and a CQI applicable with the corresponding transmission rank. The second power offset configuration may or may not be a fixed, predetermined power offset configuration. In one embodiment of the present invention, the BS also may indicate the second power offset configuration to the UE, via downlink signaling. The downlink signaling may be higher-layer signaling such as MAC (Medium Access Control) or RRC (Radio Resource Control) signaling or may be dynamic PDCCH (Physical Downlink Control Channel) based signaling. In another embodiment of the present invention, the UE may self-determine the second power offset configuration.

The UE then conveys (812) to the BS, and the BS receives from the UE, channel information associated with one or more of the first set of transmission parameters and the second set of transmission parameters. In one embodiment of the present invention, the UE, in conveying the channel information, may select one of the first transmission rank and the second transmission rank as a preferred transmission rank and convey an indication of the preferred transmission rank, and transmission parameters applicable with the preferred transmission rank, that is, preferred transmission parameters, to the BS. In another embodiment of the present invention, the PMI included in the preferred transmission parameters, that is, a preferred PMI, may be based on the indicated, or determined, power offset configuration for the associated transmission rank. For example, the preferred PMI may be selected from a codebook, or from a subset of the codebook, maintained in the at least one memory device 304 of the UE and which preferred PMI is selected based on the indicated, or determined, power offset configuration for the preferred transmission rank. Logic flow 800 then ends (814).

In one embodiment, the UE may be configured to report to the BS the preferred transmission parameters, for example, CQI and/or the preferred PMI, and rank corresponding to a first power offset (for example, relative to a reference antenna port) at a first time instance or instances and preferred transmission parameters, for example, CQI and/or the preferred PMI, and rank corresponding to a second power offset at a second time instance or instances. A set of possible power offsets comprising the first and second power offsets may be signaled to UE by, for example, higher-layer signaling and stored in the at least one memory device 304 of the UE, or may be predetermined and maintained in the at least one memory device 304 of the UE. The set of possible power offsets may include 0 dB (no power offset case), and the power offsets possibly may be quantized (for example, to the closest 1 dB) corresponding to the difference in path loss between the antenna ports. In another embodiment, the UE may determine an appropriate power offset, for example, from the set of possible power offsets, and report the determined/selected power offset (or an indication of the determined/selected power offset) and transmission parameters (for example, CQI, PMI) and rank that is best suited for the UE in the current channel conditions (for example, that maximizes the throughput to the UE). Further, a path loss may be determined based on the most recent reported RSRP (Reference Signal Received Power) for the antenna port.

For example, in illustration of the principles of the present invention, consider a modified signal model, with a 10 dB power offset between a transmit power of a signal transmitted to the UE by the BS via a first BS (transmitting) antenna port and a transmit power of a signal transmitted to the UE by the BS via a second BS (transmitting) antenna port. In other words, the BS applies a 10 dB transmit power offset to compensate for a differential in channel propagation loss, that is, in path loss, that is, in compensation due to the channel gain of a signal transmitted from the second BS antenna port, that is, BS antenna port 2, being 10 dB less than the channel gain of a signal transmitted at a same power level from the first BS antenna port, that is, BS antenna port 1. That is, the BS adjusts the transmit power of signals transmitted via BS antenna port 1, $\rho_1$, to be 10 dB less than the transmit power of signals transmitted to the UE from BS antenna port 2, $\rho_2$, in compensation for the 10 dB greater path loss experienced by signals transmitted to the UE via BS antenna port 2 than signals transmitted to the UE via BS antenna port 1. In an equation form, the channel between the BS and UE, with this transmit power adjustment, may be expressed as $$\begin{bmatrix} y_1 \\ y_2 \end{bmatrix} = \begin{bmatrix} \rho_1 h_{11} v_{11} + \rho_2 h_{12} v_{21} & \rho_1 h_{11} v_{12} + \rho_2 h_{12} v_{22} \\ \rho_1 h_{21} v_{11} + \rho_2 h_{22} v_{21} & \rho_1 h_{21} v_{12} + \rho_2 h_{22} v_{22} \end{bmatrix} \begin{bmatrix} s_1 \\ s_2 \end{bmatrix} + \begin{bmatrix} n_1 \\ n_2 \end{bmatrix},$$

$$\rho_1 = 0.1, \rho_2 = 1, \frac{\|H(:,1)\|^2}{\|H(:,2)\|^2} = 10.$$

Clearly this is a rank 2 channel (assuming the channel is not degenerate) between the BS and the UE, since the ratio of received powers is equal, that is, $$\frac{\rho_1 \|H(:,1)\|^2}{\rho_2 \|H(:,2)\|^2} = 1.$$

In other words, a higher capacity may be obtained by actually reducing the transmit power on one of the transmit antenna ports, for example, BS antenna port 1. More generally, such power offset may not be exactly equal to the imbalance in channel gains from antenna ports, but may be any value that helps to improve the rate of the system (or, in this example, supports rank 2 transmission).

Under the 3GPP LTE standards as they currently exist, the UE may not assume such power reduction in its operation. In order to support such individual antenna port, or TP, transmit power adjustments among each of multiple antenna ports/TPs transmitting to a same UE, communication system 100 provides for a UE to have the flexibility to select a higher transmission rank (for example, a rank 2 transmission over a rank 1 transmission) by assuming a reduced transmit power at one or more of the multiple antenna ports/TPs relative to other antenna ports/TPs of the multiple antenna ports/TPs. More particularly, communication system 100 provides for a UE to communicate, to a serving BS, an indication of a power offset for one or more of multiple antenna ports/TPs, thereby allowing the UE to choose a higher transmission rank and instruct the BS to apply different transmit powers at different antenna ports/TPs.

Figure 9:
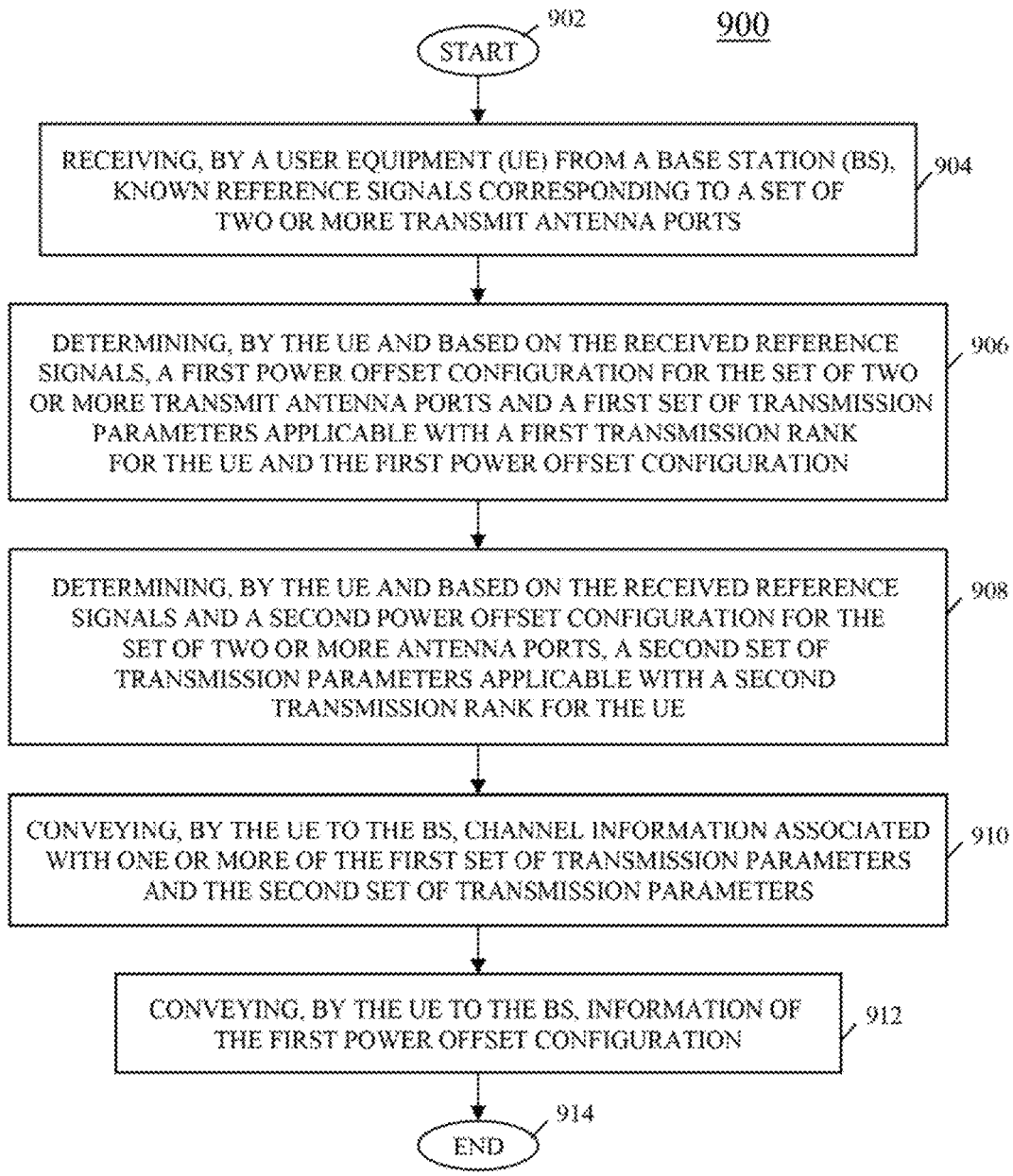
FIG. 9 is a logic flow diagram that illustrates a method of rank adaptation by communication system of FIGS. 1 and 2 in accordance with various other embodiments of the present invention.

Referring now to FIG. 9, a logic flow diagram 900 is depicted that illustrates a method of rank adaptation by communication system 100 in accordance with various other embodiments of the present invention. Logic flow 900 begins (902) when a UE, such as UEs 101-103, receives (904), from a serving BS, such as BSs 110-113 and 200, known reference signals (RSs), for example, pilot signals, corresponding to a set of two or more transmit antenna ports. Based on the received RSs, the UE determines (906) a first power offset configuration and a first set of transmission parameters applicable with a first transmission rank (for example, rank 1) for the UE and the first power offset configuration. Further, based on the received RSs and a second power offset configuration for the set of two or more antenna ports, the UE determines (908) a second set of transmission parameters applicable with a second transmission rank for the UE, for example, rank 2. For example, the first and second sets of transmission parameters may each comprise one or more of a PMI and a CQI applicable with the corresponding transmission rank.

The first and second power offset configurations may each be associated with one or more candidate power offsets of multiple possible power offsets, wherein each candidate power offset applies to one or more antenna ports of the set of two or more antenna ports. Further, the second power offset configuration may or may not comprise a fixed, predetermined power offset value associated with the second transmission rank. In one embodiment of the present invention, the BS may indicate to the UE, via downlink signaling, the second power offset configuration. The downlink signaling may be higher-layer signaling such as MAC or RRC signaling or may be dynamic PDCCH based signaling. In another embodiment of the present invention, the UE may self-determine the second power offset configuration and/or the second power offset configuration may be a default power offset configuration maintained by the UE in the at least one memory device 304 of the UE, in which latter event the default power offset configuration may correspond to a same power offset on each antenna port of the set of two or more antenna ports.

The UE then conveys (910) to the BS, and the BS receives from the UE, channel information associated with one or more of the first set of transmission parameters and the second set of transmission parameters. The UE further may convey (912) information of the first power offset configuration, that is, the configuration parameters. Logic flow 900 then ends (914). In conveying the set of transmission parameters, the UE may select one of the first transmission rank and the second transmission rank as a preferred transmission rank and convey the set of transmission parameters applicable with the preferred transmission rank. Further, as described in greater detail below, the set of transmission parameters conveyed by the UE to the BS may include a PMI and a power offset index, that is, an index to a list of multiple power offsets maintained by the at least one memory device 304, 404 of each of the BS and UE, that are separately coded, or the set of transmission parameters conveyed by the UE to the BS may include a PMI and a power offset index that are jointly coded into a single jointly coded precoding matrix index for the preferred transmission rank.

Figure 10:
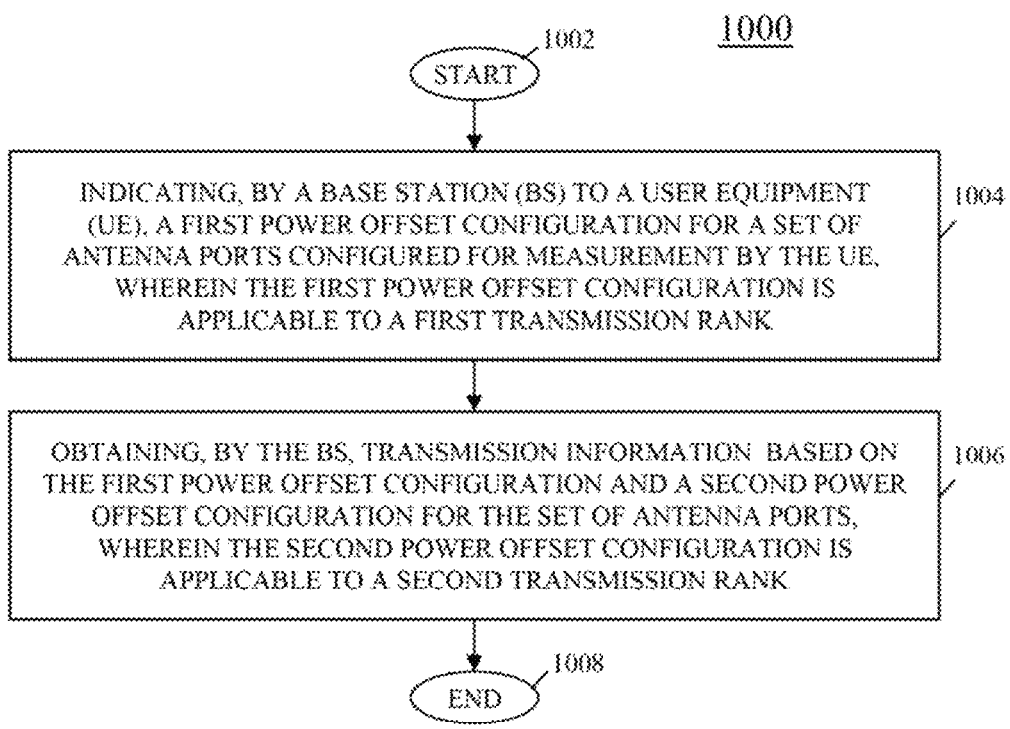
FIG. 10 is a logic flow diagram that illustrates a method of rank adaptation by communication system of FIGS. 1 and 2 in accordance with yet another embodiment of the present invention.

Referring now to FIG. 10, a logic flow diagram 1000 is depicted that illustrates a method of rank adaptation by communication system 100 in accordance with yet another embodiment of the present invention. Logic flow 1000 begins (1002) when a serving BS, such as BSs 110-113 and 200, indicates (1004), that is, transmits an indication of, to a UE, such as UEs 101-103, and the UE receives from the BS an indication of, a first power offset configuration for a set of antenna ports that are configured for measurement by the UE. In one embodiment of the present invention, the set of antenna ports that are configured for measurement by the UE may be two or more CSI-RS ports configured for channel state information feedback; however, in other embodiments of the present invention, the set of antenna ports that are configured for measurement by the UE may be any antenna ports configured for transmissions to the UE.

The first power offset configuration corresponds to one or more candidate power offsets, wherein each candidate power offset applies to one or more antenna ports of the set of antenna ports, for example, a relative transmit power to assume on each antenna port of the set of antenna ports, and wherein the first power offset configuration is applicable to a first transmission rank, for example, rank 1. Preferably, the set of antenna ports comprise CSI-RS ports that are configured for channel state information feedback, such as one or more of an RI, PMI, and a CQI, from the UE.

The BS further obtains (1006), for example, by feedback from the UE, channel information, such as one or more of an RI, PMI, and a CQI, based on the first power offset configuration and a second power offset configuration for the set of antenna ports. Logic flow diagram 1000 then ends (1008). The second power offset configuration corresponds to one or more candidate power offsets, wherein each candidate power offset applies to one or more antenna ports of the set of antenna ports, for example, a relative transmit powers to assume on each antenna port of the set of antenna ports, and wherein the second power offset configuration is applicable to a second transmission rank, for example, rank 2. The second power offset configuration may or may not be indicated by the BS to the UE. For example, in one embodiment of the present invention, the BS may indicate to the UE, via downlink signaling, the second power offset configuration. The downlink signaling may be higher-layer signaling such as MAC or RRC signaling or may be dynamic PDCCH based signaling. In another embodiment of the present invention, the UE may self-determine the second power offset configuration.

Figure 11:
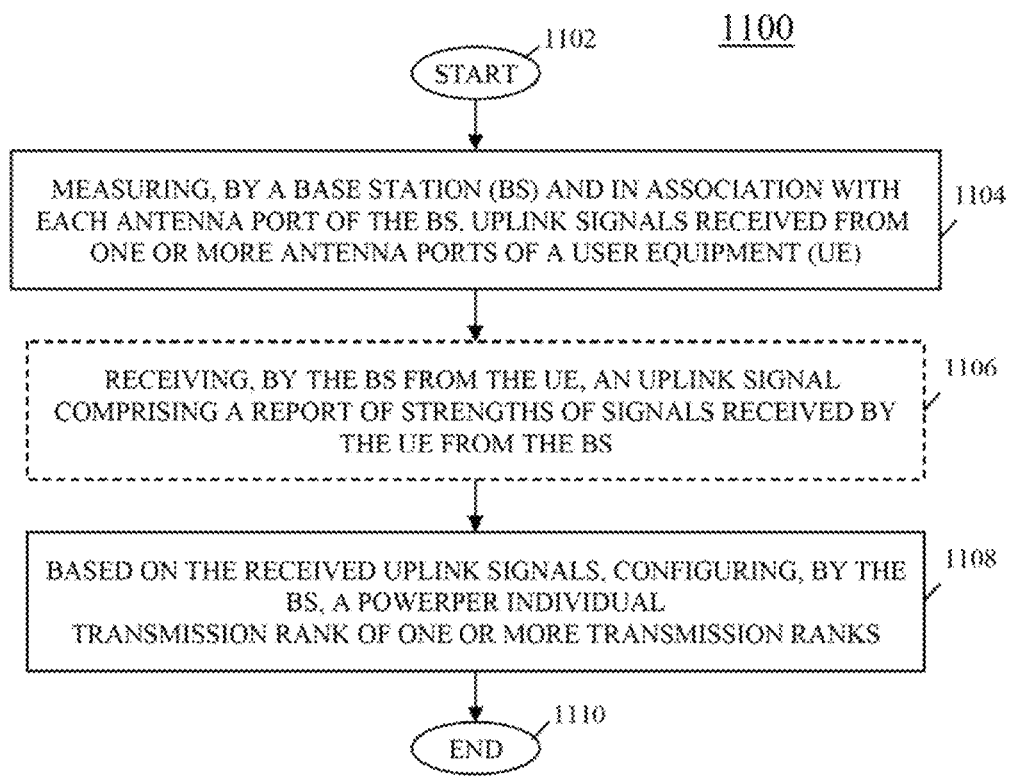
FIG. 11 is a logic flow diagram that illustrates a method performed by a base station of the communication system of FIGS. 1 and 2 in configuring antenna port-specific power offsets in accordance with various embodiments of the present invention.

Referring now to FIG. 11, a logic flow diagram 1100 is provided that illustrates a method performed by a BS of communication system 100 in configuring antenna port-specific power offsets in accordance with various embodiments of the present invention. Logic flow diagram 1100 begins (1102) when a BS, such as any of BSs 110-113 and 200, measures (1104), in association with each antenna port of the BS, uplink signals received from one or more antenna ports of a served UE, such as any of UEs 101-103. In another embodiment of the present invention, the BS may instead, or in addition, receive (1106), from the UE, an uplink signal comprising a report of strengths of signals received by the UE from the BS, such as a RSRP (Reference Signal Received Power) report of received signal strengths measured on one or more UE antenna ports. Based on the received uplink signal(s), the BS configures (1108) a power offset configuration (BS antenna port-specific power offsets), such as for per individual transmission rank of one or more transmission ranks, for example, for rank 1 and/or rank 2, and logic flow 1100 then ends (1110). The BS may configure multiple power offsets for a particular rank.

One may note that the power offset configuration, in this example, preferably is specific for a particular rank, because if a same configuration (with reduced power on one of the antenna ports) is used for rank 1 (as is used for rank 2) in the above example then the capacity is reduced for rank 1, which is not a desired result.

More generally, a rank dependent, power offset configuration also may be used by a BS for other purposes. For example, a rank dependent, power offset configuration can be used to realize a rate versus power trade-off. To be more specific, a BS may prefer to transmit at rank 2, but only if the transmit power increase is not beyond a certain value. In such a case, the BS can derive this information from UE feedback, where a UE feeds back different sets of CQI/PMI information for each individual rank and the corresponding power offset configuration, that may be configured by the BS.

In the discussion herein, reference is made to antenna port, and a per-antenna, power offset or power offset throughput. One realizes, however, that the concept of a power offset as used herein can be easily generalized to a group of antenna ports. For example, a power offset to a group of antenna ports may be applicable when subsets of the total configured ports forming the group of antenna ports may be geographically co-located and more likely to equally share the power.

Figure 12:
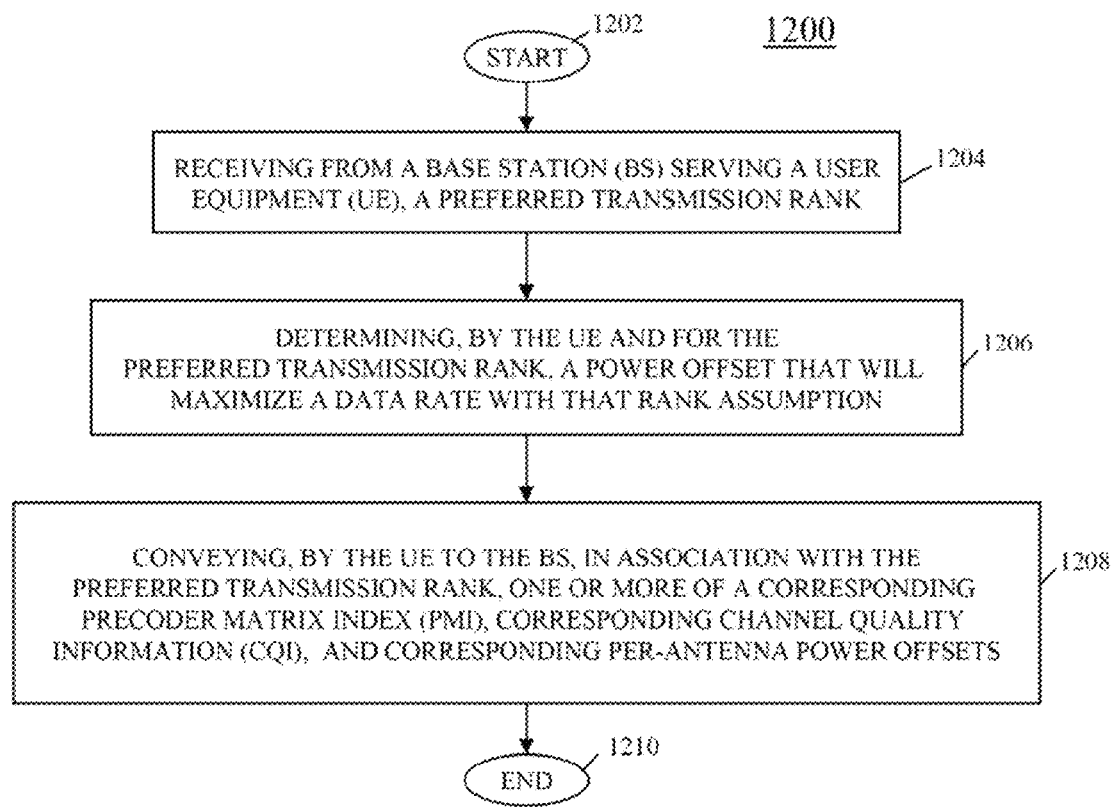
FIG. 12 is a logic flow diagram that illustrates a method performed by a user equipment of the communication system of FIGS. 1 and 2 in providing for rank adaptation in accordance with another embodiment of the present invention.

Referring now to FIG. 12, a logic flow diagram 1200 is provided that illustrates a method performed by a UE of communication system 100 in providing feedback of power offset configuration for rank adaptation in accordance with another embodiment of the present invention. In this case, a BS may explicitly request feedback for a preferred transmission rank of multiple transmission ranks Logic flow diagram 1200 begins (1202) when a UE, such as any of UEs 101-103, receives (1204) a preferred transmission rank indication from a BS, such as any of BSs 110-113 and 200. For the preferred transmission rank indicated by the received preferred transmission rank indication, the UE then determines (1206) a PMI (Precoding Matrix Index), a CQI (Channel Quality Information or Indicator), and a power offset configuration that will maximize a data rate with that rank assumption. The UE then conveys (1208), to the serving BS, for the preferred transmission rank of the multiple transmission ranks corresponding PMI/CQI/APO (Antenna port Power Offset Configuration) information determined by the UE for that transmission rank, and logic flow 1200 then ends (1210).

In one embodiment of the present invention, the power offset configuration may comprise a relative power offset expressed on each antenna port, that is, relative to the maximum power per antenna port. In such embodiments of the present invention, a UE may arrive at a conclusion that a specific power offset (resulting in a normalized total transmit signal power<1, thereby transmitting below the possible maximum transmit power constraints) is sufficient to achieve a recommended MCS (modulation and coding scheme) and may recommend a per-antenna port power offset for each rank.

In yet other embodiments of the present invention, communication system 100 may employ an extended PMI codebook, where an extended PMI codebook is a PMI codebook that is extended to include power offsets. In the current codebook, a precoder from the codebook may be expressed as $$\begin{bmatrix} v_{11} & v_{12} \\ v_{21} & v_{22} \end{bmatrix}$$

where the entries $V_{11}$, $v_{12}$, $v_{21}$, and $v_{22}$ are of equal magnitude (constant modulus). An extended codebook, for example, for two (2) transmit (BS) antenna ports, may appear as follows, where $\rho_1 \neq \rho_2$ at least for some entries, $$\begin{bmatrix} \rho_1 v_{11} & \rho_1 v_{12} \\ \rho_2 v_{21} & \rho_2 v_{22} \end{bmatrix}.$$

In one such embodiment, the extended PMI codebook may be designed to encode the precoder matrix index (PMI) values $v_{ij}$ and the power offsets $\rho_i$ separately. As an example, for four (4) transmit (BS) antenna ports, an existing four transmit (BS) antenna port codebook is used wherein each PMI value is associated with a four (4) bit pattern, representing a codebook entry out of 16 possible codebook entries, and then a bit pattern associated with a power offset value is appended onto each set of four PMI bits. If four power levels are supported, one per transmit antenna port, and using two (2) bits per offset, a total of eight (8) bits are needed to indicate, by a UE to a serving BS, an offset value for each of the two transmit antenna ports. The encoding also may depend on whether some of the transmit antenna ports are co-located. For joint transmission from two (2) transmission points (TPs), for example, two RRHs, each with two (2) transmit antenna ports, only one offset may be needed per two ports.

In another such embodiment, the extended PMI codebook may be designed more efficiently by joint encoding the PMI values and the power offsets, wherein each entry in the codebook is a value corresponding to a jointly encoded PMI value and the power offset. With the extended codebook approach, a BS may just use codebook subset restriction to limit the choice of power offsets and simultaneously also allow some freedom at the UE. A codebook subset restriction indication is currently supported in LTE specifications, which enables a BS to restrict the reporting of the PMI to only a subset of the PMI entries available in the specified codebook (available at both UE and BS), which allows the BS to control the PMI reporting to some extent.

In still other embodiments of the present invention, a UE may switch between a first reporting configuration, that is, the current feedback mode where the UE report PMI and CQI but no power offset, and a second reporting configuration where the UE recommends a power offset, that is, a feedback mode where the UE reports a PMI/CQI/RI configuration that also includes a recommended power offset (or a feedback mode with extended codebook including power offset). While the latter mode is more general, it also has more overhead and may only be suitable to some UEs.

In a more general embodiment of the above, a method is used in a UE, such as UEs 101-103, for communicating with a BS, such as BSs 110-113 and 200, which method comprises receiving, by the UE, pilot signals corresponding to two or more antenna ports, determining, by the UE and based on the pilot signals, a first power offset configuration for the set of two or more antenna ports and a first set of transmission parameters, determining, by the UE and based on the pilot signals and a default power offset configuration for the set of two or more antenna ports, a second set of transmission parameters, and conveying, by the UE and to the BS, information associated with one or more of the first set of transmission parameters and the second set of transmission parameters.

In one such embodiment, the UE may switch autonomously between these two reporting configurations (thereby providing a BS with both types of reports) and report the switch using a reporting configuration indicator that indicates the reporting configuration mode being employed by the UE. In communication system 100, a UE, such as UEs 101-103, may report, to a serving BS, such as BSs 110-113 and 200, a reporting configuration indicator (which may also be referred to as a precoding type indicator or PTI) that indicates what type of reporting configuration is being employed by the UE. For example, the following table (Table 1) is an exemplary illustration of two reporting configurations (that is, report types) that may be employed, that is, a first report type or configuration (Report 1) and a second report type or configuration (Report 2). The UE autonomously may select a report type, or configuration, that the UE will employ and then indicate the selected report type/configuration back to a BS by conveying, to the BS, a reporting configuration indicator, where such reporting configuration indicator may be conveyed with, or separate from, the report.

TABLE 1

| Report Type | Content of the Report |
|---|---|
| Report 1 | PMI/CQI/RI<br>(Wideband or Subband CQI/Subband PMI/Selected Subbands etc) |
| Report 2 | PMI/CQI/RI/APO<br>Or<br>ePMI/CQI/RI<br>where ePMI is PMI from an expanded codebook incorporating power offsets |

More generally, a BS can indicate two values of codebook-subset-restriction applicable to both or each of the two separate multiplexed reports by the UE.

In another embodiment of the present invention, instead of using a reporting configuration indicator, the UE may report, to the BS, power offsets (APO) along with a rank indication (RI), in which APO and RI are jointly encoded. This applies to the case when the power offsets and the PMI are not jointly coded, but separately encoded. One can view this as a two component approach, where an APO part of the precoding matrix is sent less frequently and the actual PMI corresponding to the legacy precoding matrix (that is, precoding matrix with constant modulus entries) may be sent more often. For example, the following table (Table 2) illustrates an example of joint encoding for a case of two (2) BS antennas, where the UE reports, to the BS, a rank indication (RI) (that is, rank 1 or rank 2) and an APO (encoded as [X Y] in example below).

TABLE 2

Encoding of Antenna Power Offset (APO) per Antenna Port, with two total Antenna Ports

| Rank | APO (dB) |
|---|---|
| Rank 1 | [0 0]<br>[−3 0]<br>[0 −3]<br>[0 −10]<br>[−10 0]<br>[−∞ 0]<br>[0 −∞]<br>Note: A configuration like [−∞ 0] essentially indicates antenna selection and not transmission from the corresponding antenna port(s). |
| Rank 2 | [0 0]<br>[−3 0]<br>[0 −3]<br>[−3 −3]<br>[−6 −3]<br>[−3 −6]<br>[−6 −6]<br>[−∞ 0]<br>[0 −∞] |

For example, for a rank 1 transmission involving two BS antennas, an APO of [0 0] corresponds to use of a same transmit power on each antenna, an APO of [−3 0] corresponds to use a transmit power on a first antenna that is 3 dB less than that a transmit power on the second antenna, an APO of [0 −3] corresponds to use a transmit power on a second antenna that is 3 dB less than that a transmit power on the first antenna, and so on. A UE then may use a rank-dependent encoding in the above example and Table 2, which allows for optimization for each rank of the bit representation. However, in a more general instance, the APO may be specified as a per antenna relative power offset with reference to a particular antenna port, where relative power offsets may each be independently encoded. For example, with respect to the above Table 2, in the instance of the UE feeding back [−3 0], the UE instead may merely feedback a relative power offset of −3 dB for the first antenna port, and in the instance of the UE feeding back [0 −3], the UE instead may merely feedback a relative power offset of −3 dB for the second antenna port. Alternatively, the power offset may be relative to first antenna port with a UE power offset feedback (corresponding to the second antenna port) of +3 dB to indicate [−3 0], and −3 dB to indicate [0 −3].

The above discussion assumes that a UE can measure a channel accurately on the downlink reference signal (RS), but that the UE determines that only a lower rank may be supported due to impairments expected in demodulation, essentially allowing the UE to only recognize a rank 1 channel. In the presence of measurement errors on the pilot signals, especially with large dynamic range of individual signals, it may not be possible for the UE to detect a weaker channel in the presence of a stronger channel. So, in this case, the UE can only reliably recommend a lower rank transmission, irrespective of flexibility to use additional power offset in its feedback assumptions/precoding. Hence, some of the solutions proposed may not apply if the UE has measurement errors. One approach is to improve the reliability of measurement at the UE to be robust to the dynamic range of the measured pilots observed at the UE.

Some additional changes could help to resolve this issue. Referring now to FIGS. 13A and 13B, a CSI-RS pattern is depicted where two CSI-RS ports for two (2) transmit antenna ports are CDM'ed on adjacent OFDM symbols in time. As depicted in FIGS. 13A and 13B, eight (8) CSI-RSs, $R_1$-$R_8$, corresponding to four CDM pairs of CSI-RS ports, are depicted, which CSI-RSs are distributed among pairs of REs in a time-frequency diagram. Impairments like Doppler and leakage of signal due to timing jitter or other impairments may mean that the second, weaker signal corresponding to the second antenna port (which shares the CDM pair with a stronger antenna port) is not accurately estimated and the UE obtains a highly impaired channel estimate on the second signal. This may result in UE reporting a wrong rank and even a wrong PMI.

In one embodiment of the present invention, a BS may resolve this problem by pre-compensating for the power imbalance, that is, reducing the power on one of the CSI-RS ports to avoid impairing the other CSI-RS port. Note that in this case, the BS has to indicate to the UE such UE-specific offset applied on the CSI-RS ports so that the UE compensates for the offset (which may be indicated as part of the CSI-RS configuration) in its feedback measurements. For example, if the initial normalized power on each port is [1 1] and the power with offset on CSI-RS ports is [P 1], then the UE may assume that the signal on one antenna port can be boosted by up to 1/P. Further, the BS may apply rank dependent per-antenna port offsets as discussed before on top of this scheme with respect to the reference offset and similar feedback methods may be used.

More generally, a BS may use certain power control on the pilot signals to improve measurements at the UE device. Further, the BS may compensate for such power control by implicitly or explicitly requesting measurements corresponding to an offset (which could be partly a function of any power control applied on the pilots) or allow the UE to report APOs as part of the feedback report, both of which methods are described in detail above.

In another embodiment of the present invention, a BS may resolve the problem of impaired demodulation performance due to reference signal power differences by re-configuring the CSI-RS antenna ports, that is, remapping CSI-RS ports, so that CSI-RS ports corresponding to geographically separated antenna ports can be assigned such that they are not in the same CDM pair or the same OFDM symbol. This may require adding additional CSI-RS configurations or making CSI-RS configuration/mapping flexible. This latter embodiment can be generalized such that geographically separated antenna ports can be mapped to non-adjacent CSI-RS ports (that is, not multiplexed by CDM on the same REs) and only co-located antenna ports are mapped to a CDM pair. It is possible to achieve this by defining new/additional CSI-RS configurations or defining a generalized remapping indication. One way of achieving such generalized mapping is to signal to the UE one of the available CSI-RS reference signal configurations (which could of length 2, 4 or 8), a number of antenna ports (which is less than or equal to the total number of ports in the indicated CSI-RS configurations), and a mapping function of each antenna port to each location of the CSI-RS configuration.

In the foregoing specification, specific embodiments have been described. However, one of ordinary skill in the art appreciates that various modifications and changes can be made without departing from the scope of the invention as set forth in the claims below. Accordingly, the specification and figures are to be regarded in an illustrative rather than a restrictive sense, and all such modifications are intended to be included within the scope of present teachings.

The benefits, advantages, solutions to problems, and any element(s) that may cause any benefit, advantage, or solution to occur or become more pronounced are not to be construed as a critical, required, or essential features or elements of any or all the claims. The invention is defined solely by the appended claims including any amendments made during the pendency of this application and all equivalents of those claims as issued.

Moreover in this document, relational terms such as first and second, top and bottom, and the like may be used solely to distinguish one entity or action from another entity or action without necessarily requiring or implying any actual such relationship or order between such entities or actions. The terms "comprises," "comprising," "has," "having," "includes", "including," "contains", "containing" or any other variation thereof, are intended to cover a non-exclusive inclusion, such that a process, method, article, or apparatus that comprises, has, includes, contains a list of elements does not include only those elements but may include other elements not expressly listed or inherent to such process, method, article, or apparatus. An element proceeded by "comprises . . . a", "has . . . a", "includes . . . a", "contains . . . a" does not without more constraints, preclude the existence of additional identical elements in the process, method, article, or apparatus that comprises, has, includes, contains the element. The terms "a" and "an" are defined as one or more unless explicitly stated otherwise herein. The terms "substantially," "essentially," "approximately," "about," or any other version thereof, are defined as being close to as understood by one of ordinary skill in the art, and in one non-limiting embodiment the term is defined to be within 10%, in another embodiment within 5%, in another embodiment within 1% and in another embodiment within 0.5%. The term "coupled" as used herein is defined as connected, although not necessarily directly and not necessarily mechanically. A device or structure that is "configured" in a certain way is configured in at least that way, but may also be configured in ways that are not listed.

The Abstract of the Disclosure is provided to allow the reader to quickly ascertain the nature of the technical disclosure. It is submitted with the understanding that it will not be used to interpret or limit the scope or meaning of the claims. In addition, in the foregoing Detailed Description, it can be seen that various features are grouped together in various embodiments for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed Description, with each claim standing on its own as a separately claimed subject matter.

What is claimed is:

1. A method in a user equipment for communicating with a base station, the method comprising:
   receiving, from the base station, pilot signals on a set of two or more antenna ports;
   receiving a first power offset configuration indication representing different relative transmit power levels for the set of two or more antenna ports;
   determining, based on the received pilot signals and the first power offset configuration indication, a first set of transmission parameters applicable with a first transmission rank for the user equipment;
   determining, based on the received pilot signals and a second power offset configuration representing different relative transmit power levels for the set of two or more antenna ports, a second set of transmission parameters applicable with a second transmission rank for the user equipment;
   selecting one of the first and second transmission ranks as a preferred transmission rank wherein the first transmission rank is associated with the first power offset configuration indication and wherein the second transmission rank is associated with the second power offset configuration; and
   conveying, to the base station, the preferred transmission rank and transmission parameters associated with the preferred transmission rank.

2. The method of claim 1, wherein the first power offset configuration indication and the second power offset configuration corresponds to one or more candidate power offsets, where each candidate power offset applies to one or more antenna ports of the set of two or more antenna ports.

3. The method of claim 1, wherein the second power offset configuration is a fixed predefined configuration.

4. The method of claim 1, further comprising receiving, via downlink signaling, an indication of the second power offset configuration corresponding to the second transmission rank.

5. The method of claim 1, wherein conveying information to the base station comprises:

conveying, to the base station, transmission parameters corresponding to both the first and the second transmission ranks.

6. The method of claim 1, wherein the transmission parameters associated with the preferred transmission rank are one or more of a preferred precoding matrix index and a channel quality information associated with the preferred transmission rank.

7. The method of claim 6, wherein the preferred precoding matrix index is selected from a codebook subset based on an indicated power offset configuration corresponding to the preferred transmission rank.

8. A method in a user equipment for communicating with a base station, the method comprising:
   receiving pilot signals corresponding to a set of two or more antenna ports;
   determining, based on the pilot signals, a first power offset configuration representing different relative transmit power levels for the set of two or more antenna ports and a first set of transmission parameters applicable with a first transmission rank and the first power offset configuration for the user equipment;
   determining, based on the pilot signals and a second power offset configuration representing different relative transmit power levels for the set of two or more antenna ports, a second set of transmission parameters applicable with a second transmission rank for the user equipment;
   conveying, to the base station, information associated with one or more of the first set of transmission parameters and the second set of transmission parameters;
   wherein determining the first or second set of transmission parameters applicable with a respective transmission rank comprises determining one or more of a precoding matrix index and a channel quality information; and
   wherein conveying information associated with one or more of the first set of transmission parameters and the second set of transmission parameters comprises conveying, to the base station, the precoding matrix index and a power offset index as a single jointly encoded precoding matrix index for the respective transmission rank.

9. The method of claim 8, wherein each power offset configuration corresponds to one or more candidate power offsets, where each candidate power offset applies to one or more antenna ports of the set of two or more antenna ports.

10. The method of claim 8, further comprising conveying to the base station the first set of transmission parameters of the first power offset configuration.

11. The method of claim 8, wherein the second power offset configuration is a fixed pre-defined value associated with the second transmission rank.

12. The method of claim 8, wherein the second power offset configuration, corresponding to the second transmission rank, is conveyed by the base station.

13. A method in a wireless base station, the method comprising:
   indicating a first power offset configuration representing different relative transmit power levels for a set of antenna ports that are configured for measurement, the first power offset configuration applicable to a first transmission rank;
   obtaining feedback information from a user equipment, based on the first power offset configuration and a second power offset configuration, wherein the second power offset configuration represents different relative transmit power levels corresponding to the set of antenna ports and is applicable to a second transmission rank; and
   wherein obtaining the feedback information comprises receiving a selected preference transmission rank and associated parameters wherein the first transmission rank is associated with the first power offset configuration indication and wherein the second transmission rank is associated with the second power offset configuration.

14. The method of claim 13, wherein each power offset configuration corresponds to one or more candidate power offsets, where each candidate power offset applies to one or more antenna ports of the set of antenna ports.

15. The method of claim 13, further comprising indicating the second power offset configuration to the user equipment.

16. The method of claim 13, wherein the set of antenna ports that are configured for measurement are two or more Channel State Information-Reference Signal (CSI-RS) ports configured for channel state information feedback.

17. The method of claim 16, wherein the channel state information feedback comprises one or more of a rank indication and a channel quality information.

18. A method in a user equipment for communicating with a base station, the method comprising:
   receiving pilot signals corresponding to a set of two or more antenna ports;
   determining, based on the pilot signals, a first power offset configuration representing different relative transmit power levels for the set of two or more antenna ports and a first set of transmission parameters;
   determining, based on the pilot signals and a default power offset configuration representing different relative transmit power levels for the set of two or more antenna ports, a second set of transmission parameters;
   selecting one of a first and second transmission ranks as a preferred transmission rank wherein the first transmission rank is associated with the first power offset configuration and wherein the second transmission rank is associated with the default power offset configuration; and
   conveying, to the base station, the preferred transmission rank and transmission parameters associated with the preferred transmission rank.

19. The method of claim 18, wherein each power offset configuration corresponds to one or more candidate power offsets, where each candidate power offset applies to one or more antenna ports of the two or more antenna ports.

20. The method of claim 18, where the default power offset configuration corresponds to a same power offset on each antenna port of the set of two or more antenna ports.

21. The method of claim 18, further comprising conveying to the base station information associated with the first set of transmission parameters and the second set of transmission parameters at corresponding first and second time instances.

22. The method of claim 18, further comprising:
   determining whether to send the first or second set of transmission parameters; and
   indicating the determination to the base station.

23. The method of claim 18, where the first set of transmission parameters includes a first one or more of a preferred transmission rank indication (RI), precoding matrix index (PMI), and a channel quality indication (CQI) and the second set of transmission parameters includes a second one or more of a preferred RI, PMI, and CQI.

24. A user equipment capable of communicating with a base station, the user equipment comprising:
  a wireless transceiver configured to receive pilot signals corresponding to a set of two or more antenna ports and receive a first power offset configuration representing different relative transmit power levels for the set of two or more antenna ports;
  a processor configured to determine, based on the received pilot signals and the first power offset configuration, a first set of transmission parameters applicable with a first transmission rank for the user equipment, determine, based on the received pilot signals and a second power offset configuration representing different relative transmit power levels for the set of two or more antenna ports, a second set of transmission parameters applicable with a second transmission rank for the user equipment;
  to select one of the first and second transmission ranks as a preferred transmission rank wherein the first transmission rank is associated with the first power offset configuration and wherein the second transmission rank is associated with the second power offset configuration; and
  to convey, to the base station and via the wireless transceiver, the preferred transmission rank and transmission parameters associated with the preferred transmission rank.

25. The user equipment of claim 24, wherein each power offset configuration corresponds to one or more candidate power offsets, where each candidate power offset applies to one or more antenna ports of the set of two or more antenna ports.

26. The user equipment of claim 24, wherein the second power offset configuration is a fixed predefined configuration.

27. The user equipment of claim 24, wherein the wireless transceiver is configured to receive, via downlink signaling, an indication of the second power offset configuration corresponding to the second transmission rank.

28. The user equipment of claim 24, wherein the processor is configured to convey information to the base station by conveying to the base station transmission parameters corresponding to both the first and the second transmission ranks.

29. The user equipment of claim 24, wherein the transmission parameters associated with the preferred transmission rank are one or more of a preferred precoding matrix index and a channel quality information associated with the preferred transmission rank.

30. The user equipment of claim 29, wherein the preferred precoding matrix index is selected from a codebook subset based on an indicated power offset configuration corresponding to the preferred transmission rank.

31. A user equipment capable of communicating with a base station, the user equipment comprising:
  a wireless transceiver configured to receive pilot signals corresponding to a set of two or more antenna ports;
  a processor configured to determine, based on the pilot signals, a first power offset configuration representing different relative transmit power levels for the set of two or more antenna ports and a first set of transmission parameters applicable with a first transmission rank and the first power offset configuration for the user equipment, determine, based on the pilot signals and a second power offset configuration representing different relative transmit power levels for the set of two or more antenna ports, a second set of transmission parameters applicable with a second transmission rank for the user equipment;
  wherein the processor is configured to determine the first or second set of transmission parameters applicable with a respective transmission rank by determining one or more of a precoding matrix index and a channel quality information; and
  wherein the processor is configured to convey information associated with one or more of the first set of transmission parameters and the second set of transmission parameters by conveying, to the base station, the precoding matrix index and a power offset index as a single jointly encoded precoding matrix index for the respective transmission rank.

32. The user equipment of claim 31, wherein each power offset configuration corresponds to one or more candidate power offsets, where each candidate power offset applies to one or more antenna ports of the set of two or more antenna ports.

33. The user equipment of claim 31, wherein the processor is configured to convey to the base station, via the wireless transceiver, the first set of transmission parameters of the first power offset configuration.

34. The user equipment of claim 31, wherein the second power offset configuration is a fixed pre-defined value associated with the second transmission rank.

35. The user equipment of claim 31, wherein the second power offset configuration, corresponding to the second transmission rank, is conveyed by the base station.

36. A base station comprising:
  a wireless transceiver;
  a processor configured to indicate a first power offset configuration representing different relative transmit power levels for a set of antenna ports that are configured for measurement, the first power offset configuration applicable to a first transmission rank, obtain feedback information from a user equipment, based on the first power offset configuration and a second power offset configuration, wherein the second power offset configuration represents different relative transmit power levels corresponding to the set of antenna ports and is applicable to a second transmission rank; and
  wherein obtaining the feedback information comprises receiving a selected preference transmission rank and associated parameters wherein the first transmission rank is associated with the first power offset configuration indication and wherein the second transmission rank is associated with the second power offset configuration.

37. The base station of claim 36, wherein each power offset configuration corresponds to one or more candidate power offsets, where each candidate power offset applies to one or more antenna ports of the set of antenna ports.

38. The base station of claim 36, wherein the processor is configured to indicate the second power offset configuration to the user equipment.

39. The base station of claim 36, wherein the set of antenna ports that are configured for measurement are two or more Channel State Information-Reference Signal (CSI-RS) ports configured for channel state information feedback.

40. The base station of claim 39, wherein the channel state information feedback comprises one or more of a rank indication and a channel quality information.

41. A user equipment capable of communicating with a base station, the user equipment comprising:

a wireless transceiver configured to receive pilot signals corresponding to two or more antenna ports; and a processor configured to determine, based on the pilot signals, a first power offset configuration representing different relative transmit power levels for the set of two or more antenna ports and a first set of transmission parameters, determine, based on the pilot signals and a default power offset configuration representing different relative transmit power levels for the set of two or more antenna ports, a second set of transmission parameters;

to select one of a first and second transmission ranks as a preferred transmission rank wherein the first transmission rank is associated with the first power offset configuration and wherein the second transmission rank is associated with the default power offset configuration; and to convey, to the base station, the preferred transmission rank and transmission parameters associated with the preferred transmission rank.

42. The user equipment of claim 41, wherein each power offset configuration corresponds to one or more candidate power offsets, where each candidate power offset applies to one or more antenna ports of the two or more antenna ports.

43. The user equipment of claim 41, where the default power offset configuration corresponds to a same power offset on each antenna port of the set of two or more antenna ports.

44. The user equipment of claim 41, wherein the processor is configured to convey, to the base station, information associated with the first set of transmission parameters and the second set of transmission parameters at corresponding first and second time instances.

45. The user equipment of claim 41, wherein the processor is configured to determine whether to send first or second set of transmission parameters and indicate the determination to the base station.

46. The user equipment of claim 41, where the first set of transmission parameters includes a first one or more of a preferred transmission rank indication (RI), precoding matrix index (PMI), and a channel quality indication (CQI) and the second set of transmission parameters includes a second one or more of a preferred RI, PMI, and CQI.

\* \* \* \* \*